(12) United States Patent
Ikeda

(10) Patent No.: US 8,411,426 B2
(45) Date of Patent: *Apr. 2, 2013

(54) INFORMATION PROCESSING DEVICE AND DISPLAY DEVICE

(75) Inventor: Kiyohiko Ikeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 12 days.

This patent is subject to a terminal disclaimer.

(21) Appl. No.: 12/912,311

(22) Filed: Oct. 26, 2010

(65) Prior Publication Data

US 2011/0038117 A1 Feb. 17, 2011

Related U.S. Application Data

(62) Division of application No. 12/488,977, filed on Jun. 22, 2009, now Pat. No. 7,848,090, which is a division of application No. 11/637,729, filed on Dec. 13, 2006, now Pat. No. 7,589,959.

(30) Foreign Application Priority Data

Aug. 23, 2006 (JP) ................................. 2006-226485

(51) Int. Cl.
G06F 1/16 (2006.01)
(52) U.S. Cl. .................................. 361/679.21
(58) Field of Classification Search ............. 361/679.21; 248/917–924
See application file for complete search history.

(56) References Cited

U.S. PATENT DOCUMENTS

| | | | |
|---|---|---|---|
| 6,343,006 B1 | 1/2002 | Moscovitch et al. | |
| 6,560,094 B2 | 5/2003 | Schmidt | 361/681 |
| 6,940,714 B2 | 9/2005 | Helot et al. | 361/679.21 |
| 6,952,343 B2 | 10/2005 | Sato | 361/679.57 |
| 7,061,754 B2 | 6/2006 | Moscovitch | 361/683 |
| 7,145,767 B2 | 12/2006 | Mache et al. | 361/681 |
| 7,317,613 B2 | 1/2008 | Quijano et al. | 361/686 |
| 7,471,511 B2 | 12/2008 | Montag et al. | 361/679.41 |
| 7,589,959 B2* | 9/2009 | Ikeda | 361/679.21 |
| 7,848,090 B2* | 12/2010 | Ikeda | 361/679.21 |
| 8,047,489 B2* | 11/2011 | Watanabe | 248/292.14 |
| 2003/0231460 A1 | 12/2003 | Moscovitch | 361/681 |
| 2004/0004810 A1 | 1/2004 | Kim | 361/681 |
| 2004/0174671 A1 | 9/2004 | Huang et al. | 361/683 |
| 2004/0190236 A1 | 9/2004 | Medica et al. | 361/683 |
| 2004/0240167 A1* | 12/2004 | Ledbetter et al. | 361/683 |
| 2005/0105260 A1 | 5/2005 | Lee | 361/683 |
| 2005/0270731 A1 | 12/2005 | Yin | 361/681 |
| 2006/0221565 A1 | 10/2006 | Doherty et al. | 361/683 |
| 2006/0274495 A1 | 12/2006 | Nakamura et al. | 361/686 |
| 2006/0290812 A1 | 12/2006 | Hsu | 348/552 |
| 2008/0048984 A1* | 2/2008 | Ikeda | 345/168 |

(Continued)

FOREIGN PATENT DOCUMENTS

JP 2003-515193 4/2003

OTHER PUBLICATIONS

U.S. Appl. No. 11/637,729, filed Dec. 13, 2006, Kiyohiko Ikeda, Fujitsu Limited.

(Continued)

Primary Examiner — Lisa Lea Edmonds
(74) Attorney, Agent, or Firm — Staas & Halsey LLP

(57) ABSTRACT

An information processing device has: a support stand having a base that lies flat and a pole that stands on the base; a processing unit that performs data processing; a display panel that displays an image; and a storage unit that stores information. The device further has an adaptor that supports the processing unit and the storage unit, when the adaptor is attached to the support stand. The adaptor also supports the display panel such that the processing unit and the storage unit are hidden behind the display panel.

12 Claims, 43 Drawing Sheets

U.S. PATENT DOCUMENTS

2009/0262494 A1* 10/2009 Ikeda .................. 361/679.21
2010/0177473 A1* 7/2010 Wu et al. .............. 361/679.21

OTHER PUBLICATIONS

U.S. Appl. No. 12/488,977, filed Jun. 22, 2009, Kiyohiko Ikeda, Fujitsu Limited.

U.S. Office Action mailed Oct. 7, 2008 in co-pending parent U.S. Appl. No. 11/637,729 (8 pages).

U.S. Office Action mailed Feb. 26, 2009 in co-pending parent U.S. Appl. No. 11/637,729 (6 pages).

Notice of Allowance mailed Jul. 27, 2010 in related co-pending U.S. Appl. No. 12/488,977 (9 pages).

Notice of Allowance mailed Jun. 5, 2009 in related co-pending U.S. Appl. No. 11/637,729 (6 pages).

Japanese Office Action issued on Mar. 15, 2011 in corresponding Japanese Application No. 2006-226485. (3 pages) (4 pages English Translation).

* cited by examiner

INFORMATION PROCESSING DEVICE AND DISPLAY DEVICE

CROSS REFERENCE TO RELATED APPLICATIONS

This application is a divisional application of application Ser. No. 12/488,977 filed Jun. 22, 2009, now U.S. Pat. No. 7,848,090, which is a divisional of application Ser. No. 11/637,729 (now U.S. Pat. No. 7,589,959) filed Dec. 13, 2006, and claims priority to Japanese Application No. 2006-226485 filed Aug. 23, 2006. The disclosures of which are hereby incorporated herein by reference.

BACKGROUND OF THE INVENTION

1. Field of the Invention

The present invention relates to an information processing device such as a personal computer, which stores, processes and displays information.

2. Description of the Related Art

Information processing devices such as personal computers are widely used. Recent technical progress has been remarkable in the field of information processing device like in other technical fields and therefore, information processing devices have been rapidly improved in terms of speed-enhancement, increase in capacity, size reduction, weight reduction, etc.

Nowadays, user satisfaction has already reached an extremely high level because information processing devices have been functionally improved to a large extent. Therefore, not only high performance, but also user friendliness including excellent usability, handleability and design has become more important than before. Further, beyond the average level of excellent usability and handleability satisfying most of users, users now desire further higher usability and handleability that enables a device to operate in various ways as desired by individual users.

The function of processing and storing data of a personal computer is extremely important. However, it is desirable to make a unit performing such function mostly or completely invisible in term of user-friendliness. What is important for a user is a layout where units such as a keyboard for entering information or a display for displaying images are arranged as desired by the user.

However, conventional personal computers are far from user friendly in terms of structure, because a main unit that performs data processing in a typical personal computer stands out extremely.

Meanwhile, portable laptop computers are also widely used. However, usually, a user cannot freely arrange a keyboard and a screen at any desired position on a laptop computer. Therefore, although it is true that laptop computers are excellent in portability, their user friendliness is not satisfactory.

Meanwhile, a user tends to select a display device suitable for his/her purpose to use a computer system. When the purpose is changed or the display device becomes out of order due to a screen abnormality etc., the user needs to change the display device or purchase another one.

SUMMARY OF THE INVENTION

In view of the foregoing, the present invention provides an information processing device capable of implementing various layouts as desired by individual users, and also provides a display device changeable in various ways as desired by individual users.

An information processing device of the invention includes:

a support member having a base that lies flat and a pole that stands on the base;

a processing unit that performs data processing;

a display section that displays an image;

a first adaptor that supports the display section when the first adaptor is attached to the support member; and a second adaptor that supports the processing unit and the display section such that the processing unit is hidden behind the display section, when the second adaptor is attached to the support member.

The information processing device of the invention enables a layout where the support member supports the display section alone by use of the first adaptor, thereby allowing the processing unit to be placed at a separate location, or a layout where the support member supports both the display section and the processing unit by use of the second adaptor. In the layout where the support member supports both the display section and the processing unit, the processing unit is supported such that it is hidden behind the display section. That is, the organization in this layout is visually simplified by making the processing unit out of sight.

In the information processing device of the invention, preferably, any of plural display sections of different sizes is selectable as the display section, and the first adaptor is capable of supporting any of the plural display sections.

When the information processing device is thus configured, it is possible to select one desired by a user from two or more display sections of different sizes, and to support the selected display section with the support member via the first adaptor.

Preferably, the information processing device of the invention further includes a storage unit that stores information, wherein the processing unit and the storage unit, in the state of being supported by the second adaptor, support the display section, and the second adaptor supports the display section via the processing unit and the storage unit by making the processing unit and the storage unit bear at least a part of the weight of the display section.

The size of a display section is generally lager than other elements and thus, a large adaptor may be required to stably support the large display screen when the adaptor alone is used to support the display screen. On the contrary, according to the invention, by making the processing unit and the storage unit bear part of the weight of the display section as described above, it is possible to support the display section with a wide area, thereby improving the stability of support of the display section. In addition, because the processing unit and the storage unit are provided independently of each other, it is possible to arrange the processing unit and the storage unit either side by side or separately, in a layout where the processing unit and the storage unit are placed apart from the display section.

In the information processing device of the invention, preferably, the first and second adaptors are magnetically attractable to the support member, and the display section is magnetically attractable to the first adaptor.

Also, in the information processing device of the invention, preferably, the processing unit and the storage unit are magnetically attractable to the second adaptor, and the display section is magnetically attractable to the processing unit and the storage unit.

By use of magnetic attraction, it is possible to readily change the layout of the information processing device.

The information processing device of the invention preferably further includes a storage unit that stores information, wherein when the second adaptor is attached to the support member, the second adaptor laterally supports the processing unit and the storage unit, and also supports a pair of the display sections laterally arranged, such that the processing unit and the storage unit are hidden behind the display sections.

This additional feature makes the information processing device of the invention further convenient for a user requiring two screens.

In the information processing device of the invention, preferably, the processing unit and the storage unit, in the state of being supported by the second adaptor, support the respective display sections, and the second adaptor supports the display sections via the processing unit and the storage unit, by making the processing unit bear at least a part of the weight of the display section supported by the processing unit while making the storage unit bear at least a part of the weight of the display section supported by the storage unit.

When the two display screens are thus used together, it is necessary to support these screens with a very large area. Therefore, in the information processing device of the invention, the processing unit and the storage unit are both made to bear part of the weight of the display sections, in order to stably support these two display screens.

In the information processing device of the invention, preferably, the processing unit and the storage unit are magnetically attractable to the second adaptor, and the display sections are magnetically attractable to the processing unit and the storage unit, respectively.

By use of magnetic attraction, it is possible to readily change the layout of the information processing device.

A display device of the invention includes:

a support member having a base that lies flat and a pole that stands on the base; and an adaptor that supports any selected from plural display sections when the adaptor is attached to the support member.

In the display device of the invention, any selected from the plural display sections as desired by a user is supported by the support member support via the adaptor. Therefore, the user can use the display device only by changing the display section as desired or depending on the situation, without changing the entire display device.

The display device of the invention preferably further includes a first adaptor and a second adaptor as the adaptor, wherein the first adaptor supports a first display section selected from the plural display sections, when the first adaptor is attached to the support member, the second adaptor supports a second display section selected from the plural display sections and different from the first display screen, when the second adaptor in place of the first adaptor is attached to the support member.

This additional feature makes it possible to support the display section with the support member via the adaptor suitable for the selected display.

The display device of the invention preferably further includes a third adaptor as the adaptor, wherein the third adaptor is capable of supporting two or more first display sections selected from the plural display sections, when the third adaptor in place of the first and second adaptors is attached to the support member.

This additional feature makes it possible for a user to carry out works requiring two more display screens at the same time.

In the display device of the invention, preferably, the first and second display sections are of different sizes. This additional feature makes it possible for a user to select and use any of the display sections of different sizes as desired or depending on the situation.

In the display device of the invention, preferably, the first through third adaptors are magnetically attractable to the support member, and the first and second display sections are magnetically attractable to the first and second adaptors, respectively.

By use of magnetic attraction, it is possible to readily change the layout of the display device.

As described above, the information processing device and the display device of the invention can realize layouts as desired or required by individual users.

DETAILED DESCRIPTION OF THE INVENTION

A personal computer (hereinafter referred to as "PC") including an embodiment of the present invention will be described.

The PC described below includes: an information input device having a keyboard as a main element; and an information processing device composed of various components. First, the information input device will be described with reference to FIGS. 1 through 11 and subsequently, the information processing device will be described with reference to FIG. 12 and thereafter.

Figure 1:
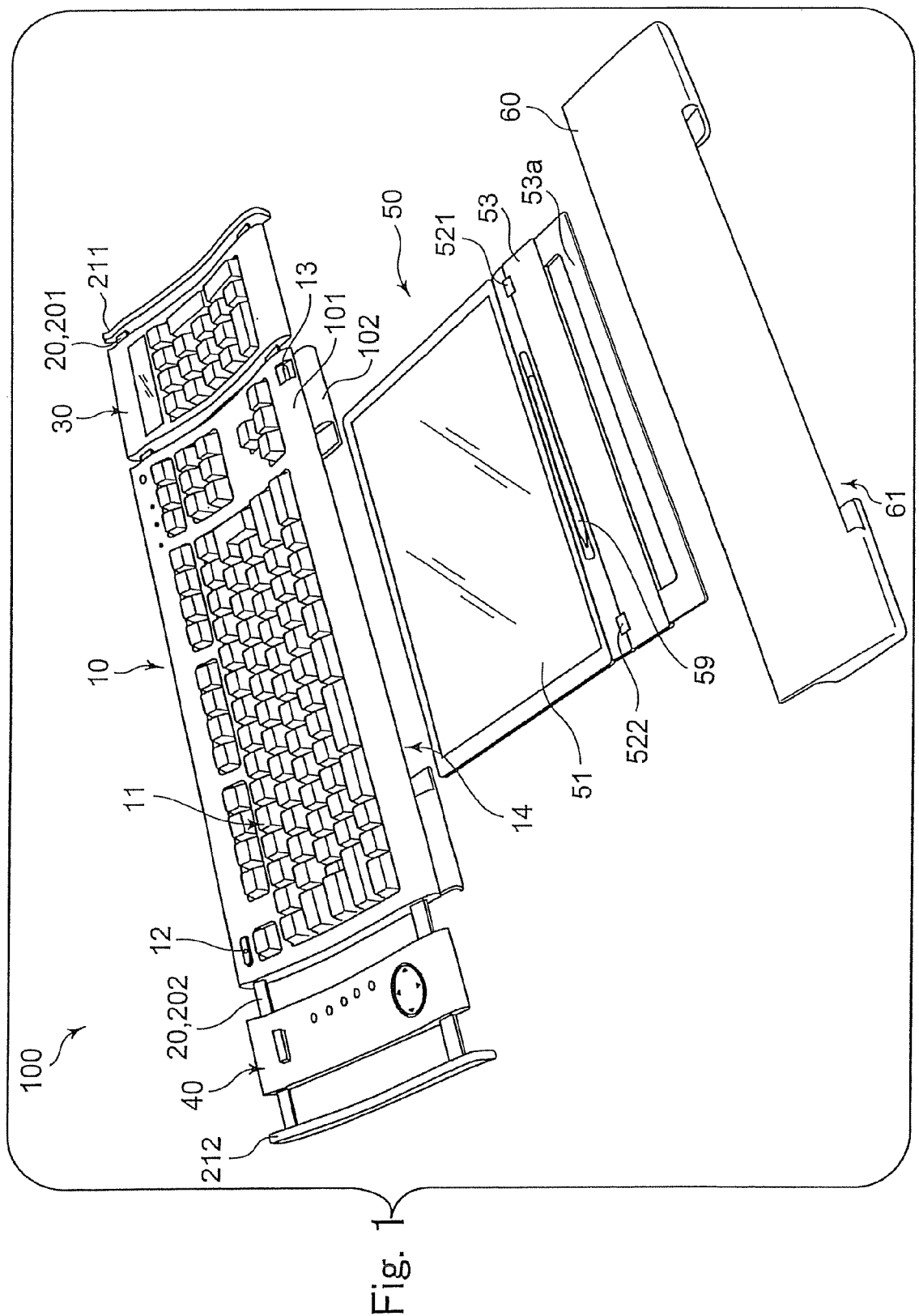
FIG. 1 is a diagram showing the entire structure of an information input device.

FIG. 1 is a diagram showing the entire structure of an information input device 100.

The information input device 100 shown in FIG. 1 has a housing provided independently of the information processing device that will be described later with reference to FIG. 12 and thereafter. The information input device 100 is capable of transmitting information to the information processing device. The information input device 100 is composed of a keyboard 10, a frame 20, a keypad unit 30, a remote-controller unit 40, a handwriting input board 50 and a palmrest 60.

Figure 10:
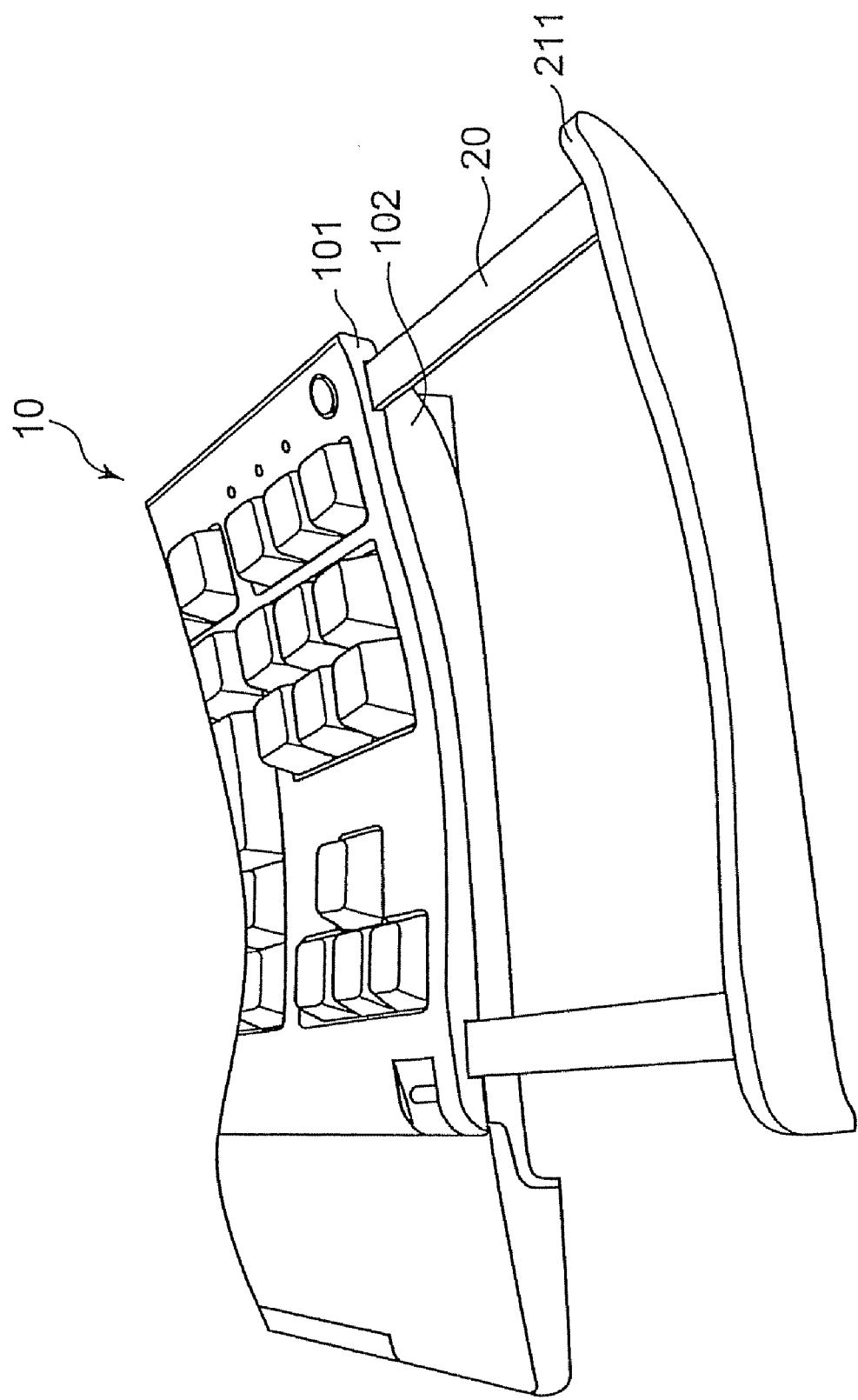
FIG. 10 is a perspective view of a flank of the keyboard.
Figure 11:
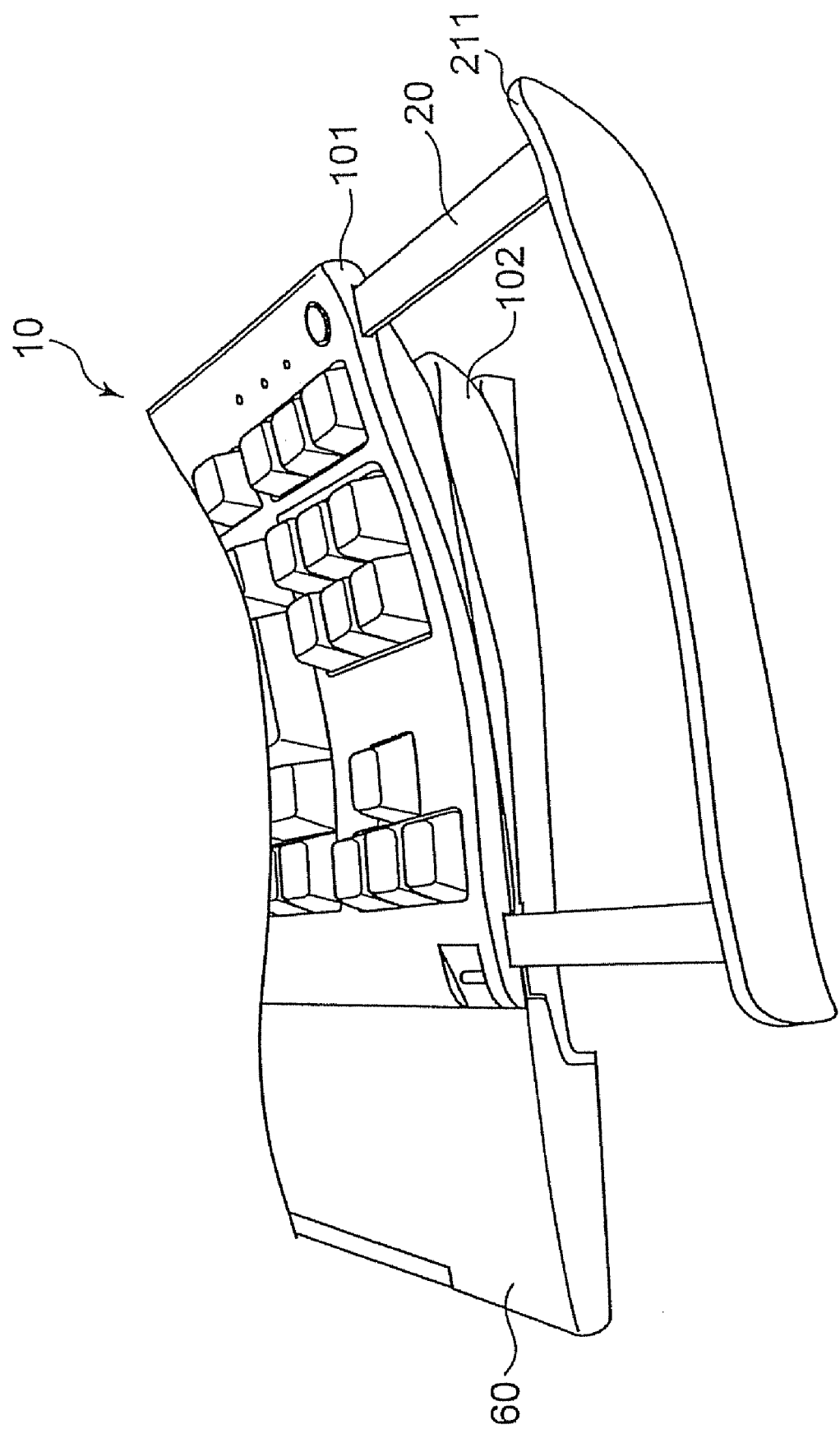
FIG. 11 is another perspective view of the flank of the keyboard.

The keyboard 10 is composed of: a main section 101 whose top face has multiple keys 11 arranged thereon; and a support section 102 that supports the main section 101 (see also FIGS. 10 and 11).

As shown in FIG. 1, disposed on the top face of the main section 101 besides the keys 11 are a power button 12 and a fingerprint sensor 13 used for authentication. The support section 102 has a board housing section 14 formed to house the handwriting input board 50.

The frame 20 is composed of a pair of frames: a right frame 201 and a left frame 202 disposed on the right and left of the keyboard 10, respectively. The frames 201 and 202 respectively have, at the respective outer ends thereof, cosmetic plates 211 and 212 whose outline shapes are the same as those of the respective flanks of the keyboard 10. These frames 201 and 202 except for the cosmetic plates 211 and 212 are inserted in the keyboard 10, and can be pulled out of the keyboard 10 when in use. When the frames 201 and 202 are inserted into the keyboard 10 when not in use, the cosmetic plates 211 and 212 abut the respective flanks of the keyboard 10 and serve as the outermost flanks of the keyboard 10.

The keypad unit 30 and the remote-controller unit 40 are examples of an expansion unit of the information input device 100 provided with the keyboard 10 serving as a main component. The keypad unit 30 and the remote-controller unit 40 are so configured as to be removably mounted on the frames 201 and 202 pulled out of the keyboard 10. The keypad unit 30 and the remote-controller unit 40 thus mounted on the frames 201 and 202 are supported by the keyboard 10 via the frames 201 and 202.

As shown in FIG. 1, the keypad unit 30 is mounted on the right frame 201, while the remote-controller unit 40 is mounted on the left frame 202. However, the remote-controller unit 40 may be mounted on the right frame 201, while the keypad unit 30 may be mounted on the left frame 202. Alternatively, both the keypad unit 30 and the remote-controller unit 40 may be mounted on the right frame 201 or the left frame 202.

The keyboard 10 of the information input device 100 is a wireless keyboard and thus, information input through the keys 11 is wirelessly transmitted to a processing unit that will be described later. Also, the keypad unit 30 and the remote-controller unit 40 serving as expansion units are each provided with a wireless transmission function. Therefore, information input through the keypad unit 30 and the remote-controller unit 40 is also transmitted to the processing unit, independently of the information input through the keyboard 10.

The keyboard 10 has, on the rear face thereof, an AC adaptor connection terminal and a Universal Serial Bus (USB) connector terminal (both not shown) for receiving power. Therefore, the keyboard 10 can be supplied with power either from an AC power supply through an AC adaptor, or from other device such as the information processing device that will be described later through a USB cable. The keyboard 10 has a built-in secondary battery and thus, the supplied power is stored in the secondary battery and used for detecting key operation, transmitting information related to the key operation, and so on. In the present embodiment, the keypad unit 30 and the remote-controller unit 40 each have a built-in secondary battery. Further, both flanks of the keyboard 10, both flanks of the keypad unit 30, and both flanks of the remote-controller unit 40 are all configured to transmit and receive power through electromagnetic induction. Therefore, when the keyboard 10 and the keypad unit 30, and the keyboard 10 and the remote-controller unit 40 are arranged to contact each other, power transmission and receipt is made thereamong, thereby recharging the respective secondary batteries, so that the power stored therein is used for processing such as detection of operation and transmission of information related to the detected operation.

Meanwhile, the handwriting input board 50 includes a handwriting input section 51 serving as a digitizer. When a user writes or draws with a stylus 59 on the handwriting input section 51, information input through the writing or drawing is directly and wirelessly transmitted to the information processing device that will be described later. The handwriting input board 50 further includes a folding section 53 attached to the handwriting input section 51 via hinges 521 and 522 and foldable to be laid on the handwriting input section 51. The handwriting input board 50 is housed in the board housing section 14 of the keyboard 10 when not in use, with the folding section 53 being folded. The folding section 53 also serves as a base for standing the handwriting input section 51. The details thereof will be described later.

The handwriting input board 50 has a built-in secondary battery, and also has an electric contact (not shown) provided on a rear face of the handwriting input board 50 to receive power. When the handwriting input board 50 is inserted into the board housing section 14 of the keyboard 10, the electric contact of the handwriting input board 50 is brought into contact with an electric contact (not shown) provided in the depth of the board housing section 14 to supply power. As a result, the power is supplied from the keyboard 10 to the handwriting input board 50 and stored in the secondary battery of the handwriting input board 50. The power stored in the secondary battery is used for detecting a point touched by the stylus 59 on the handwriting input section 51 of the handwriting input board 50, and also used for transmitting characters and drawings formed by paths of the point touched by the stylus 59 and changed with time, to the information processing device that will be described later.

The handwriting input board 50 has been described so far as an example. However, in place of the handwriting input board 50, an image display panel for displaying images by wirelessly receiving image signals from the information processing device, or a panel-like or board-like unit having both the functions of image display and digitizer (handwriting input) may be employed.

Meanwhile, the palmrest 60 is removably attached to the front side of the keyboard 10 and aids user operation carried out on the keyboard 10 when a user rests the bases of his/her palms on the palmrest 60. As shown in FIG. 1, the palmrest 60 has a board-housing-extension section 61 that is connectable to the opening, which faces the palmrest 60, of the board housing section 14 of the keyboard 10. The board-housing-extension section 61 is formed to house the handwriting input board 50 in cooperation with the board housing section 14, by serving as an extended part of the board housing section 14. When the handwriting input board 50 is housed in the keyboard 10 with the palmrest 60 being attached to the keyboard 10, the folding section 53 is unfolded. In this state, an end section 53a disposed on the front side of the folding section 53 appears through the opening formed in the front side of the board-housing-extension section 61. Therefore, a user can draw the handwriting input board 50 by pulling the end section 53a with fingers or insert the handwriting input board 50 by pushing in the end section 53a with a finger, while the palmrest 60 remains attached to the keyboard 10.

Figure 2:
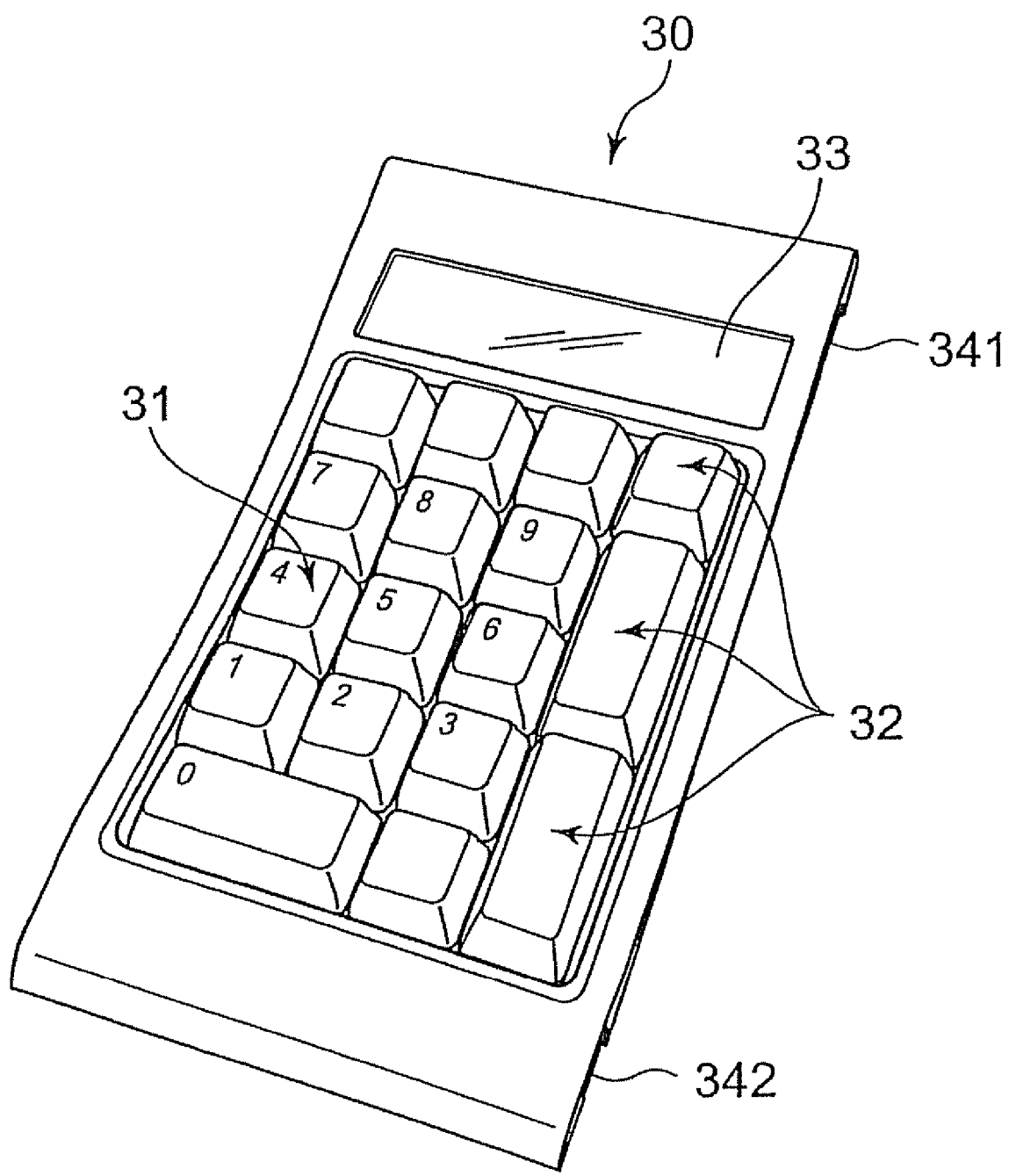
FIG. 2 is a perspective view of a keypad unit.

FIG. 2 is a perspective view of the keypad unit 30.

Disposed on the top face of the keypad unit 30 are ten-digit keys 31, function keys 32 and a display screen 33. The keypad unit 30 has a wireless communication function. Upon detection of key operation, the keypad unit 30 wirelessly transmits information related to the key operation to the information processing device that will be described later, and also displays the information on the display screen 33. Alternatively, the information may be displayed first on the display screen 33 by operation through any of the function keys 32, and then transmitted to the information processing device after a user confirms the displayed information.

The keypad unit 30 has two channels 341 and 342 formed to receive the frame 20 pulled out of the keyboard 10.

The keypad unit 30 further has a built-in secondary battery and the function of recharging the secondary battery through electromagnetic induction.

Figure 3:
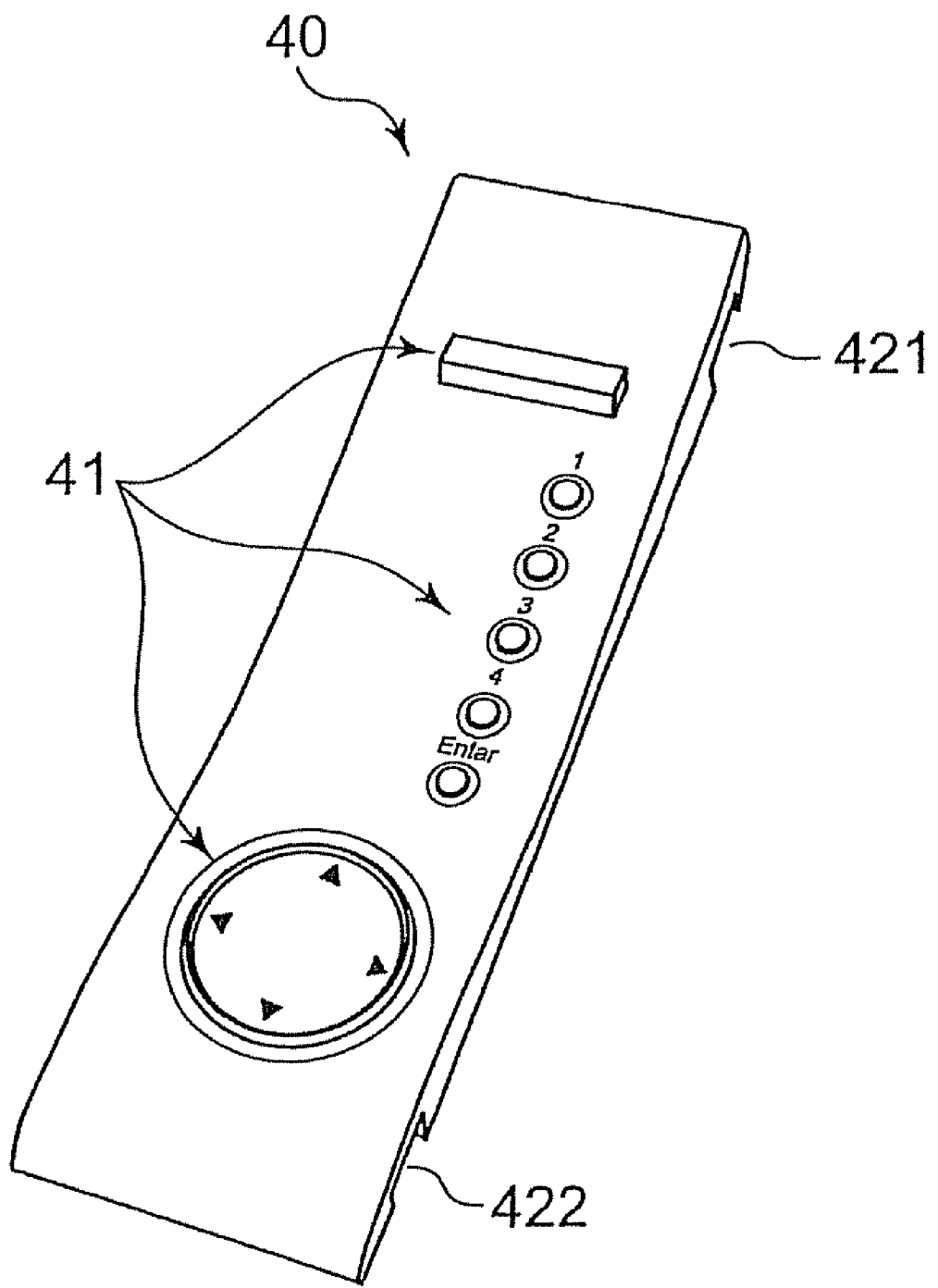
FIG. 3 is a perspective view of a remote-controller unit.

FIG. 3 is a perspective view of the remote-controller unit 40.

Disposed on the remote-controller unit 40 are plural types of operation members 41. As in the case of the keypad unit 30 described with reference to FIG. 2, the remote-controller unit 40 has a wireless communication function. Therefore, the remote-controller unit 40 is capable of wirelessly transmitting information related to user operation to the information processing device that will be described later, upon detection of the user operation.

The remote-controller unit 40 also has two channels 421 and 422 formed to receive the frame 20 pulled out of the keyboard 10.

The remote-controller unit 40 further has a built-in secondary battery and the function of recharging the secondary battery through electromagnetic induction.

In the embodiment, two types of function units, i.e. the keypad unit 30 and the remote-controller unit 40, are described as examples. However, in addition to or in place of the keypad unit 30 and the remote-controller unit 40, another function unit may be provided.

Figure 4:
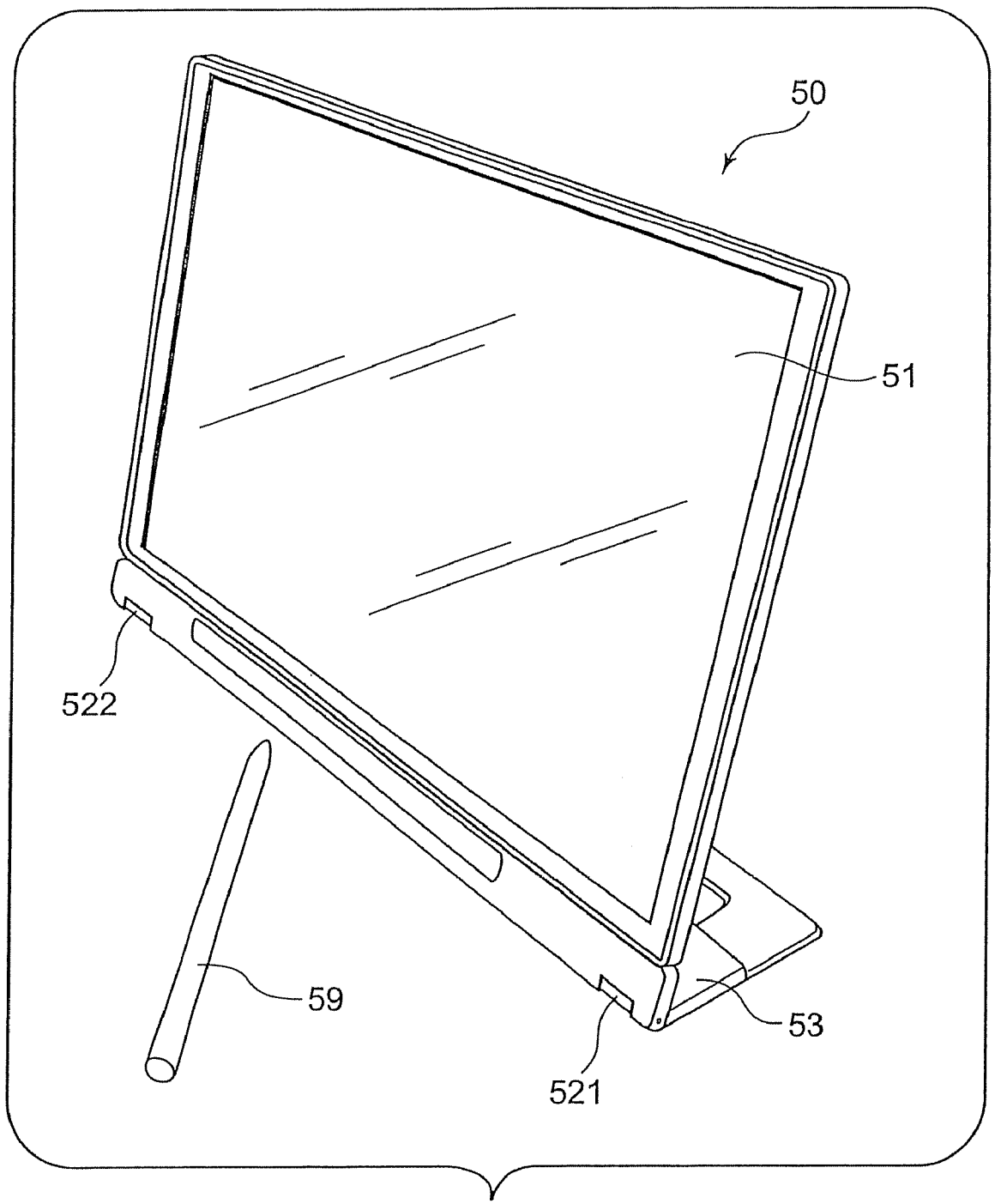
FIG. 4 is a perspective view of a handwriting input board.

FIG. 4 is a perspective view of the handwriting input board 50.

In FIG. 4, the folding section 53 is folded in the direction reverse to the folded-and-housed direction. When the folding section 53 is folded in this way, the folding section 53 cannot be folded further than the state shown in FIG. 4. The folding section 53 in this state serves as a base for standing and holding the handwriting input section 51.

The folding section 53 has a plate-like built-in secondary battery. When the handwriting input board 50 is housed in the board housing section 14 (see FIG. 1), the handwriting input board 50 is supplied with power through an electric contact (not shown) from the keyboard 10 and thus, the secondary battery of the handwriting input board 50 is recharged. The handwriting input board 50 further has a wireless communication function. When a user writes or draws with the stylus 59 on the handwriting input section 51, information representing paths of the moving stylus 59 is wirelessly transmitted from the handwriting input board 50 to the information processing device that will be described later.

Figure 5:
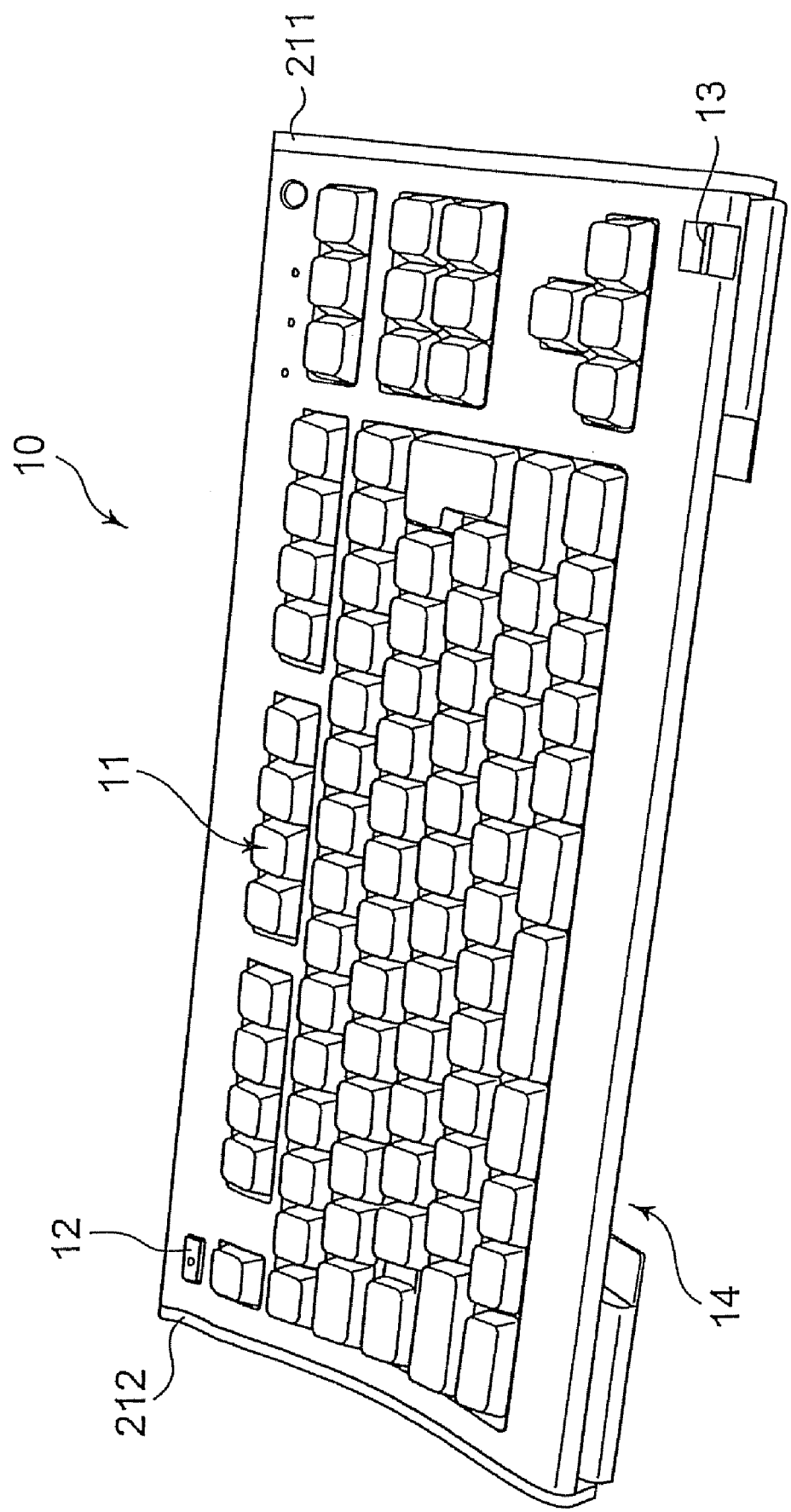
FIG. 5 is a perspective view of a keyboard.

FIG. 5 is a perspective view of the keyboard 10.

In FIG. 5, the keypad unit 30 shown in FIG. 2 and the remote-controller unit 40 shown in FIG. 3 are removed from the keyboard 10, the frames 201 and 202 (see FIG. 1) are housed in the keyboard 10, and both flanks of the keyboard 10 are respectively covered with the cosmetic plates 211 and 212.

In FIG. 5, the handwriting input board 50 shown in FIG. 4 is also removed from the keyboard 10 and thus, the opening of the board housing section 14 for housing the handwriting input board 50 is not occupied.

In this state, the keyboard 10 may be simply used as a keyboard solely with keyboard function and wirelessly transmits information related to key operation to the information processing device, upon detection of the key operation.

Figure 6:
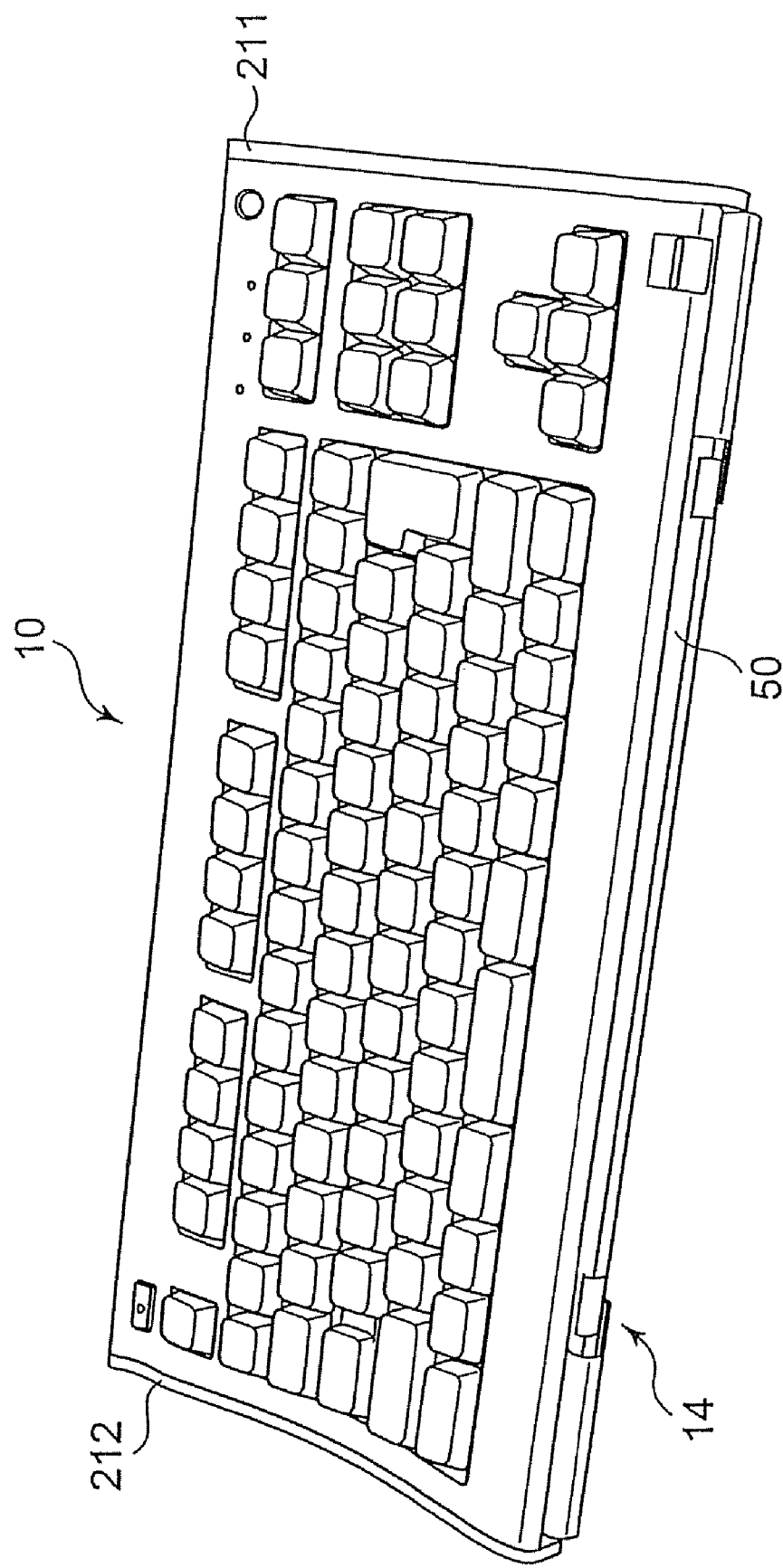
FIG. 6 is a perspective view of the keyboard in which the handwriting input board is housed.

FIG. 6 is a perspective view of the keyboard 10 in which the handwriting input board 50 is housed.

The handwriting input board 50 is housed in the board housing section 14 (see FIG. 5) of the keyboard 10 such that the folding section 53 (see FIG. 1) is folded and laid on the handwriting input board 50.

In this state, the keyboard 10 can be also used as a keyboard solely with keyboard function, and the secondary battery of the housed handwriting input board 50 is recharged.

Figure 7:
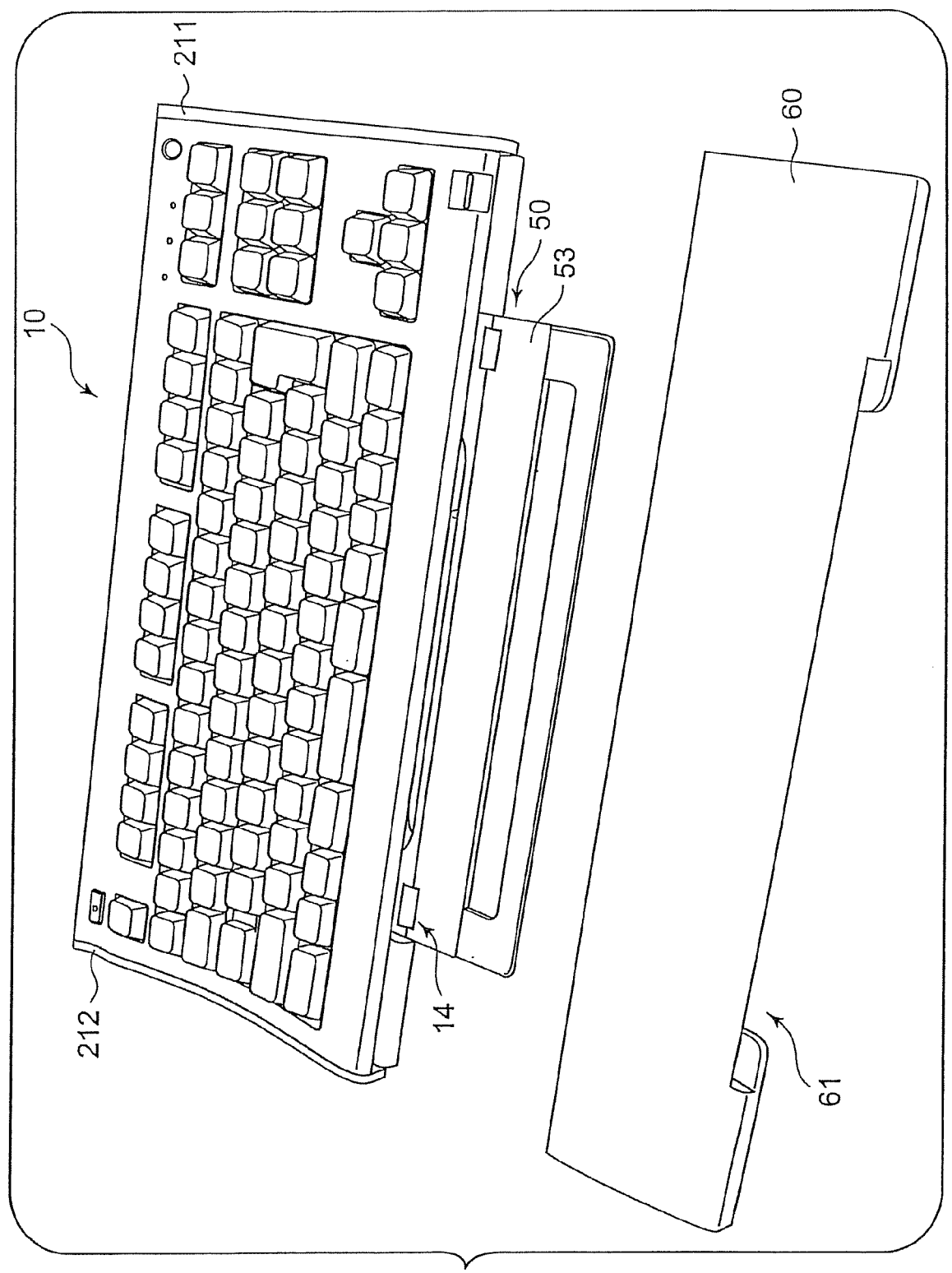
FIG. 7 is a perspective view of the keyboard where the handwriting input board with a folding section being unfolded is housed, and a palmrest.

FIG. 7 is a perspective view of the keyboard 10 where the handwriting input board 50 with the folding section 53 being unfolded is housed, and the palmrest 60.

As shown in FIG. 7, in the state when the handwriting input board 50 with the folding section 53 being unfolded is housed in the board housing section 14 of the keyboard 10, the folding section 53 is in the state of projecting from the board housing section 14. In the housed state shown in FIG. 7, the folding section 53 is ready to be housed in the board-housing-extension section 61 of the palmrest 60 upon attachment of the palmrest 60 to the keyboard 10.

Figure 8:
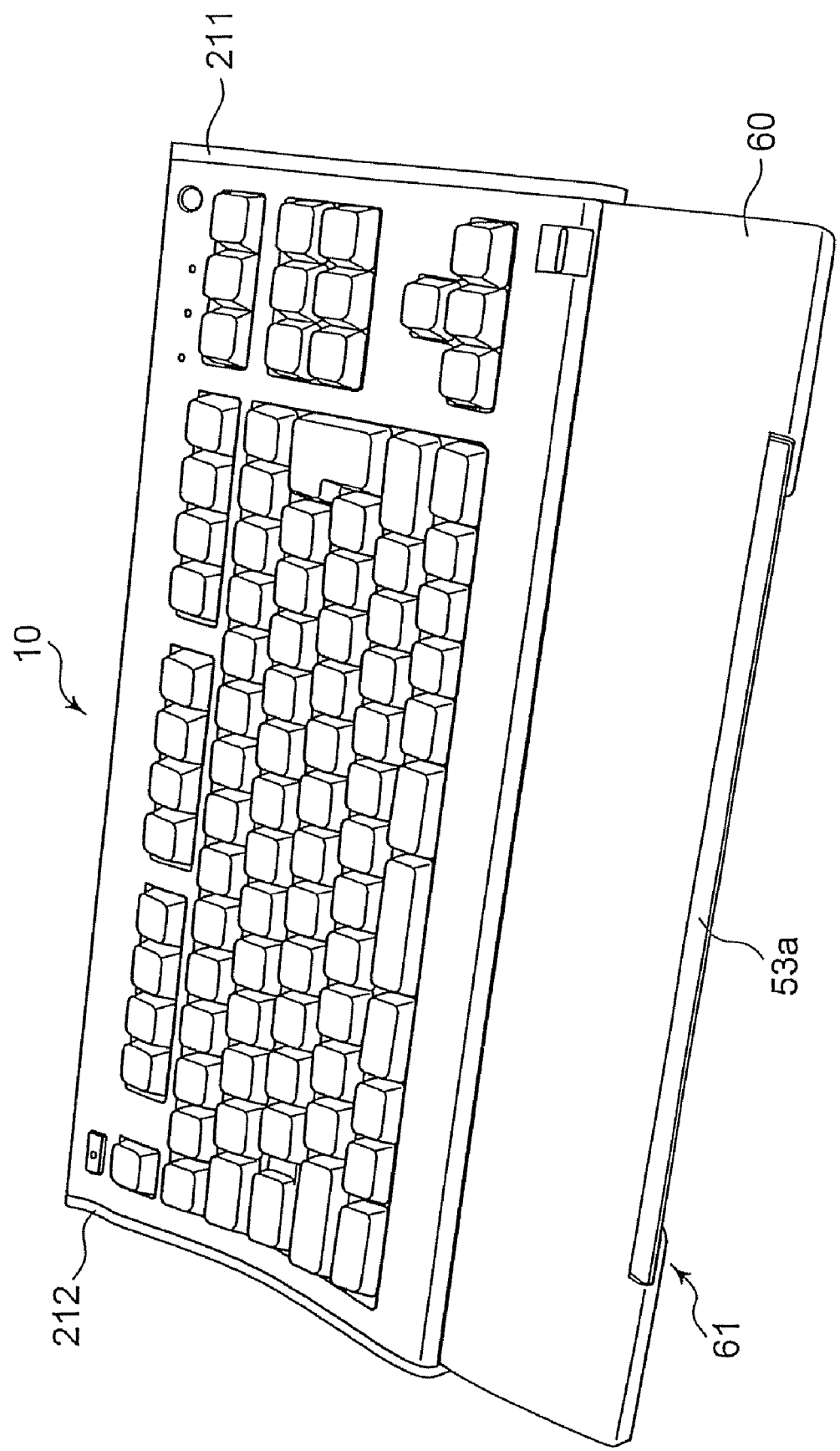
FIG. 8 is a perspective view of the keyboard to which the palmrest is attached and in which the handwriting input board is housed.

FIG. 8 is a perspective view of the keyboard 10 to which the palmrest 60 is attached and in which the handwriting input board 50 is housed.

In the state when the palmrest 60 is attached to the keyboard 10 as shown in FIG. 8, the handwriting input board 50 is housed in the board housing section 14 of the keyboard 10 and the board-housing-extension section 61 of the palmrest 60 while spreading across both the housing section 14 and the board-housing-extension section 61 (see also FIG. 7). When the handwriting input board 50 with the folding section 53 being unfolded is housed in this way, the end section 53a of the folding section 53 appears from the front-side opening of the board-housing-extension section 61 of the palmrest 60. Therefore, a user can draw the handwriting input board 50 by pulling the end section 53a with fingers or insert the handwriting input board 50 by pushing the end section 53a with a finger, while the palmrest 60 remains attached to the keyboard 10.

Figure 9:
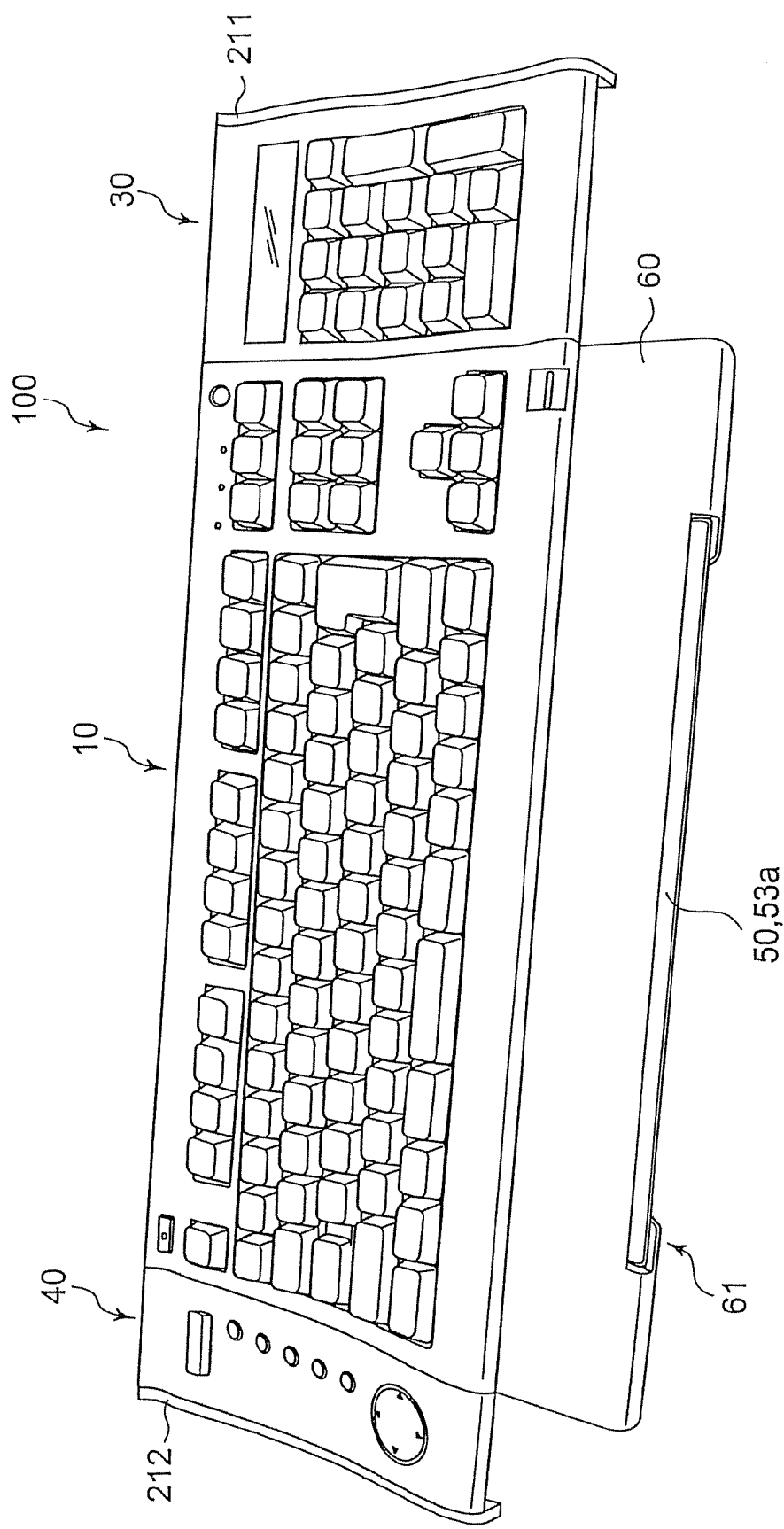
FIG. 9 is a perspective view of the information input device in the fully equipped state.

FIG. 9 is a perspective view of the information input device 100 according to the embodiment, in the state all the components are fully equipped.

The keypad unit 30 is mounted on the right frame of the keyboard 10 and is pressed by the cosmetic plate 211 from the right. Similarly, the remote-controller unit 40 is mounted on the left frame of the keyboard 10 and is pressed by the cosmetic plate 212 from the left. The keypad unit 30 and the remote-controller unit 40 are both designed to be the same as the keyboard 10 in depth, so that they altogether can substantially form a one-piece structure as a functionally extended keyboard as a whole in terms of appearance and function.

The keypad unit 30 and the remote-controller unit 40 are so configured as to recharge the respective secondary batteries with power supplied from the keyboard 10 through electromagnetic induction, in the state shown in FIG. 9.

As in the state shown in FIG. 8, the palmrest 60 is attached to the front side of the keyboard 10, and the handwriting input board 50 is housed in the keyboard 10 and the palmrest 60. The end section 53a of the folding section 53 of the handwriting input board 50 appears from the front-side opening of the board-housing-extension section 61 of the palmrest 60.

FIGS. 10 and 11 are perspective views of the right flank of the keyboard 10.

As described above, the keyboard 10 is composed of the main section 101 and the support section 102. When the main section 101 is mounted on the support section 102, the support section 102 supports the mounted main section 101 slidably in the depth direction. When the main section 101 is slid with respect to the support section 102 towards the rear side of the keyboard 10, the support section 102 raises the rear side of the main section 101, thereby tilting the main section 101.

FIG. 10 and FIG. 11 show the states before and after the main section 101 is slid towards the rear side thereof, respectively.

When the main section 101 is slid, the main section 101 is tilted such that the rear side thereof is raised and supported as it is by the support section 102. The longer the sliding distance is, the larger the tilting angle is. Therefore, it is possible for a user to use the keyboard 10 tilted at a desired angle by adjusting the sliding distance.

Meanwhile, because the main section 101 and the support section 102 are substantially equal to each other in depth and width, the support section 102 can support the main section 101 with its large surface in any state, irrespective of the sliding distance of the main section 101. Accordingly, it is possible to prevent the main section 101 from unnecessarily rattling or to prevent the set tilt angle from changing by accident, during user operation.

This concludes the description of the information input device 100 and subsequently, various examples of the information processing device will be described.

The information processing device is composed of various components, and basically includes a support stand (support member), a processing unit, a storage unit, a display panel (display section), a first adaptor and a second adaptor, and thus can be set up in various ways by combining these elements as desired. The information processing device can also serve as a display device by combining the support stand, the display panel and the adaptor (such as the first and the second adaptors).

Figure 12:
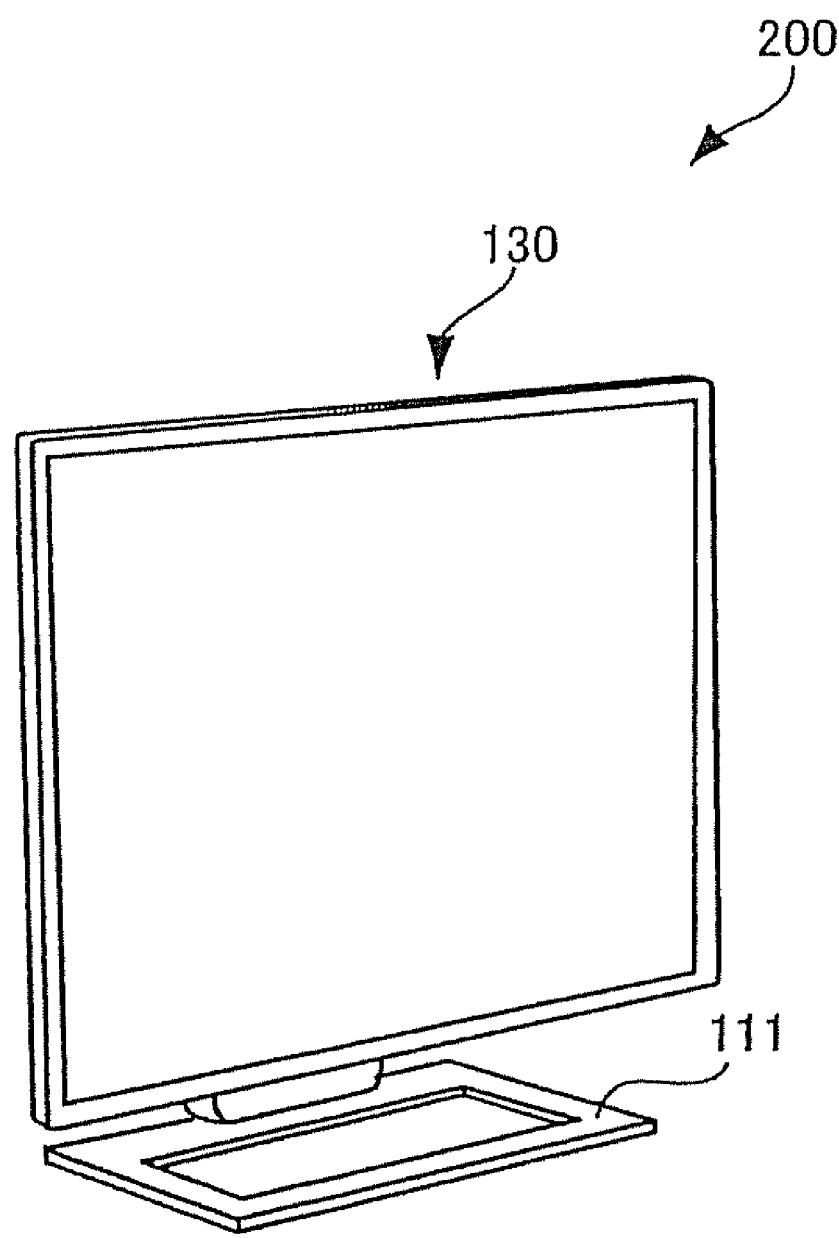
FIG. 12 is a perspective view of a display component shown as a first example of an information processing device, as viewed from the front.
Figure 13:
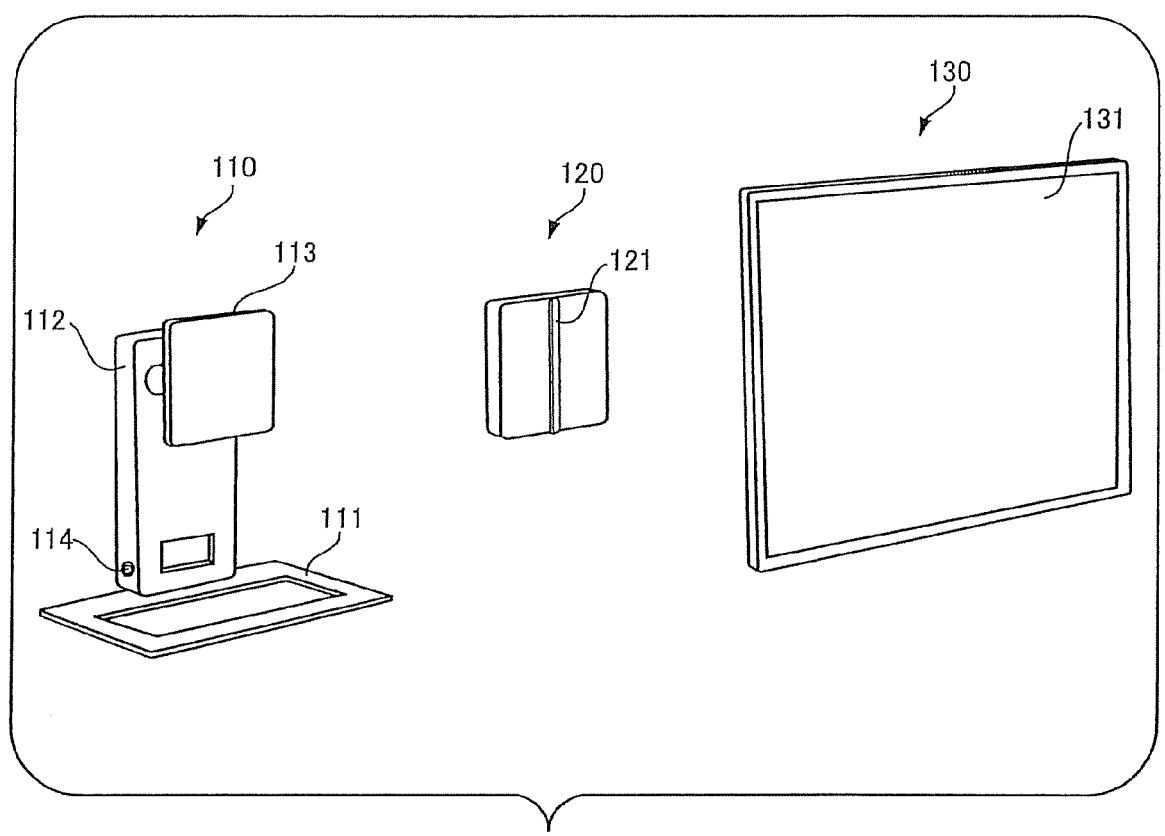
FIG. 13 is an exploded perspective view of the display component shown in FIG. 12, as viewed from the front.
Figure 14:
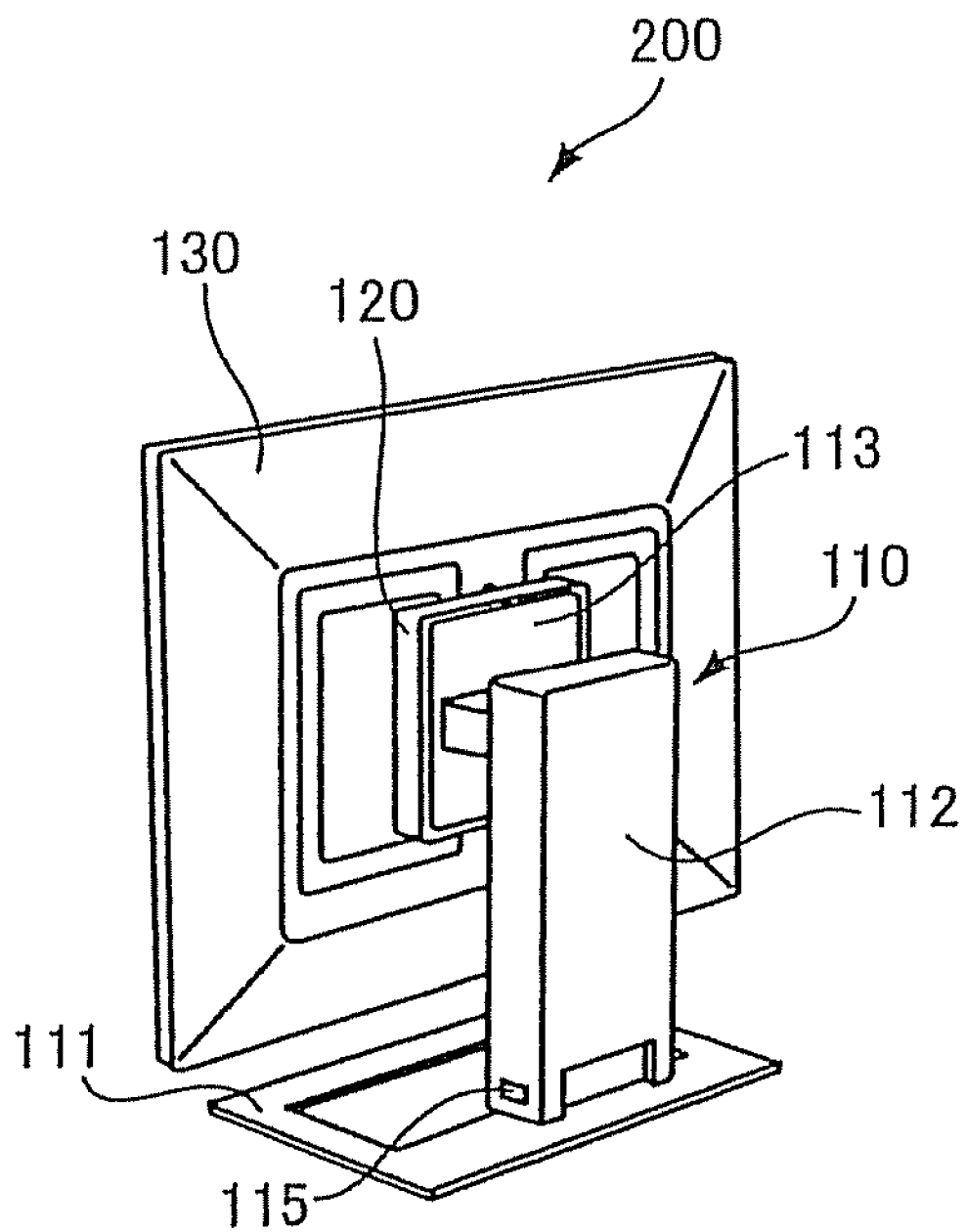
FIG. 14 is a perspective view of the display component shown in FIG. 12, as viewed from the back.
Figure 15:
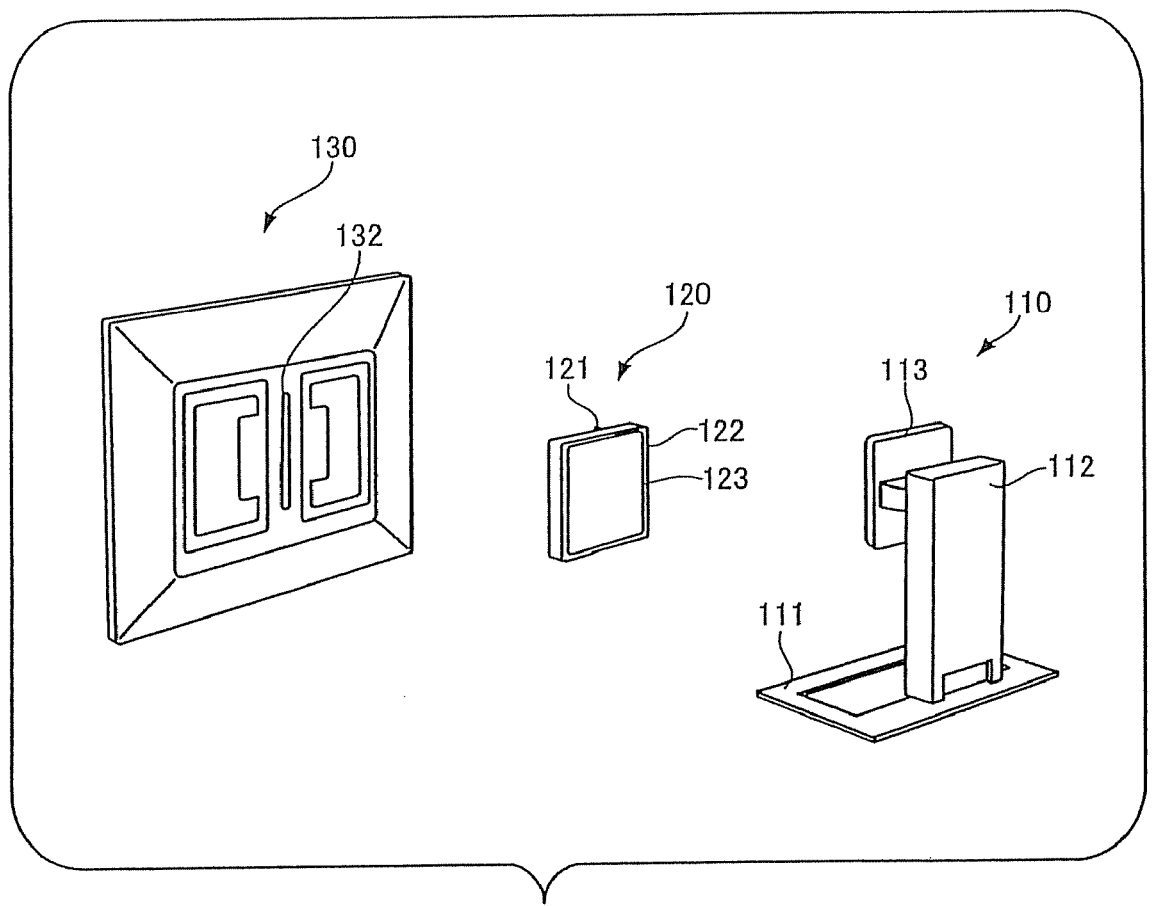
FIG. 15 is an exploded perspective view of the display component shown in FIGS. 12 and 14, as viewed from the back.

FIG. 12 is a perspective view of a first example of the information processing device (hereinafter will be referred to as a "display component" and also will be described as a first example of the display component), in a combined state as viewed from the front. FIG. 13 is an exploded perspective view of the display component shown in FIG. 12, as viewed from the front. FIG. 14 is a perspective view of the display component shown in FIG. 12, as viewed from the back. FIG. 15 is an exploded perspective view of the display component shown in FIGS. 12 and 14, as viewed from the back.

The display component shown in FIGS. 12 through 15 is a display component 200 having a support stand 110, a first adaptor 120 and a display panel 130.

The support stand 110 has a plate-like base 111 that lies flat and a pole 112 that stands on the base 111. The pole 112 has a rectangular link 113 that links an adaptor to the pole 112. The pole 112 of the support stand 110 has, on one flank thereof, an AC adaptor connection port 114 for receiving power. The pole 112 also has, on the other flank thereof, a USB connector terminal 115 into which a USB connector for supplying power to the keyboard 10 of the information input device 100 shown in FIGS. 1 through 11 is to be inserted.

Basically, two types of adaptors can be employed, namely: a first adaptor for enabling the support stand 110 to support only a display panel; and a second adaptor for enabling the support stand 110 to support, in addition to a display panel, a processing unit and a storage unit, which will be described later. In this example, the first adaptor 120 for enabling the support stand 110 to support only a display panel is employed.

The first adaptor 120 has a ridge 121 that runs vertically on a surface that faces the display panel 130. The ridge 121 has an electric contact (not shown) and thus is configured to receive power supplied from the support stand 110 and to transmit the received power to the display panel 130.

Meanwhile, as shown in FIG. 15, the first adaptor 120 has another surface facing the support stand 110, on which surface a rectangular recess 123 surrounded by a projecting frame 122 is formed. The recess 123 is a hollow in which the rectangular link 113 of the support stand 110 is to be engaged. The rectangular link 113 of the support stand 110 and the recess 123 of the first adaptor 120 have the respective electric contacts (not shown) that are connectable to each other. When the first adaptor 120 is attached to the support stand 110 by engaging the link 113 in the recess 123, power is supplied to the support stand 110 through the AC adaptor connection port 114 from an AC adaptor, and is in turn supplied from the support stand 110 to the first adaptor 120 via the respective electric contacts. The power is then supplied to the display panel 130 through the electric contact of the ridge 121 of the first adaptor 120.

Meanwhile, in order to make the rectangular link 113 of the support stand 110 and the first adaptor 120 attract each other, either one of the first adaptor 120 and the rectangular link 113 has a magnet embedded therein, while the other has a magnetic member (or a magnet disposed so as to have an attractive polarity) embedded therein.

The display panel 130 has a display screen 131 on its front face as shown in FIGS. 12 and 13. The display panel 130 also has a vertically running channel 132 on its back face as shown in FIG. 15. The channel 132 is so formed as to receive the ridge 121 of the first adaptor 120. In the channel 132, there is provided an electric contact connectable to the electric contact provided in the ridge 121 of the first adaptor 120. When the first adaptor 120 is attached to the display panel 130 such that the ridge 121 of the first adaptor 120 is engaged in the channel 132 of the display panel 130, power is supplied to the display panel 130 through the connected electric contacts respectively provided in the ridge 121 and the channel 132.

In order to securely attach the display panel 130 to the first adaptor 120 by use of magnetic force, a magnet is embedded in either one of the back of the first adaptor 120 and the display panel 130, while a magnetic member (or a magnet disposed so as to have an attractive polarity) is embedded in the other.

The display panel 130 has a built-in wireless communication function for receiving image signals wirelessly transmitted from the processing unit that will be described later. The display panel 130 receives power from the support stand 110 via the first adaptor 120 as well as receives wirelessly transmitted image signals, and displays an image on the display screen 131 based on the received image signals.

Figure 16:
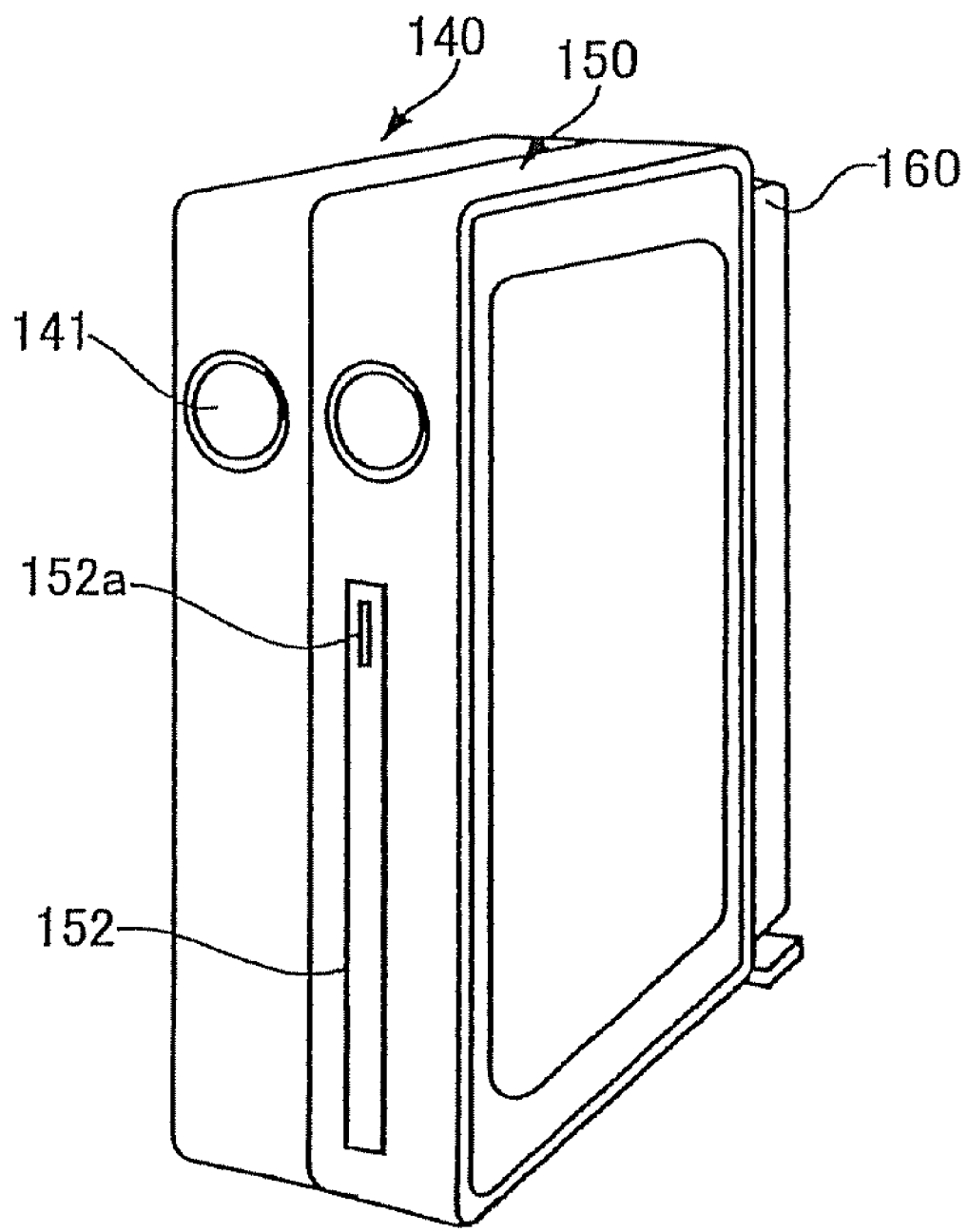
FIG. 16 is a perspective view of an example of use of a processing unit accompanied by a storage unit.
Figure 17:
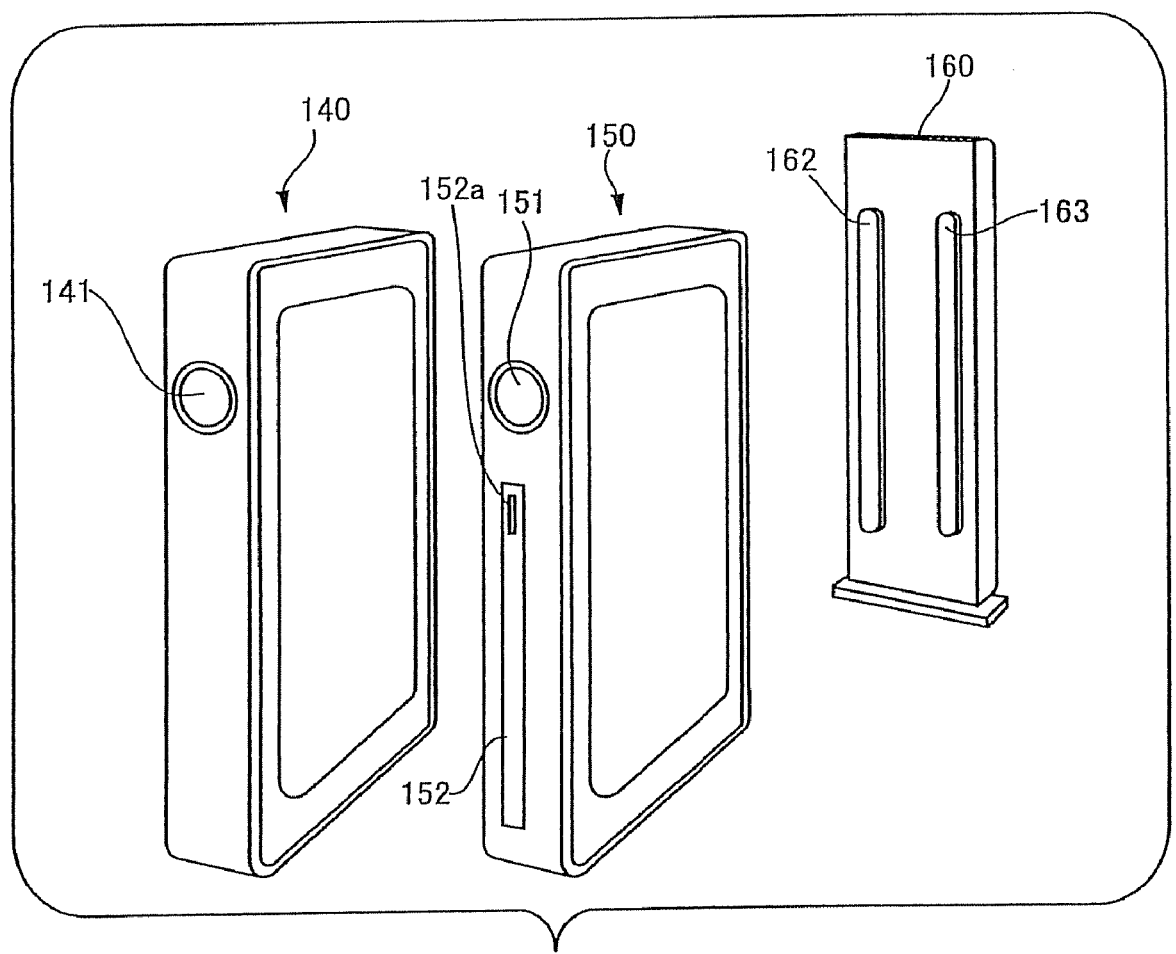
FIG. 17 is an exploded perspective view of the example shown in FIG. 16.
Figure 18:
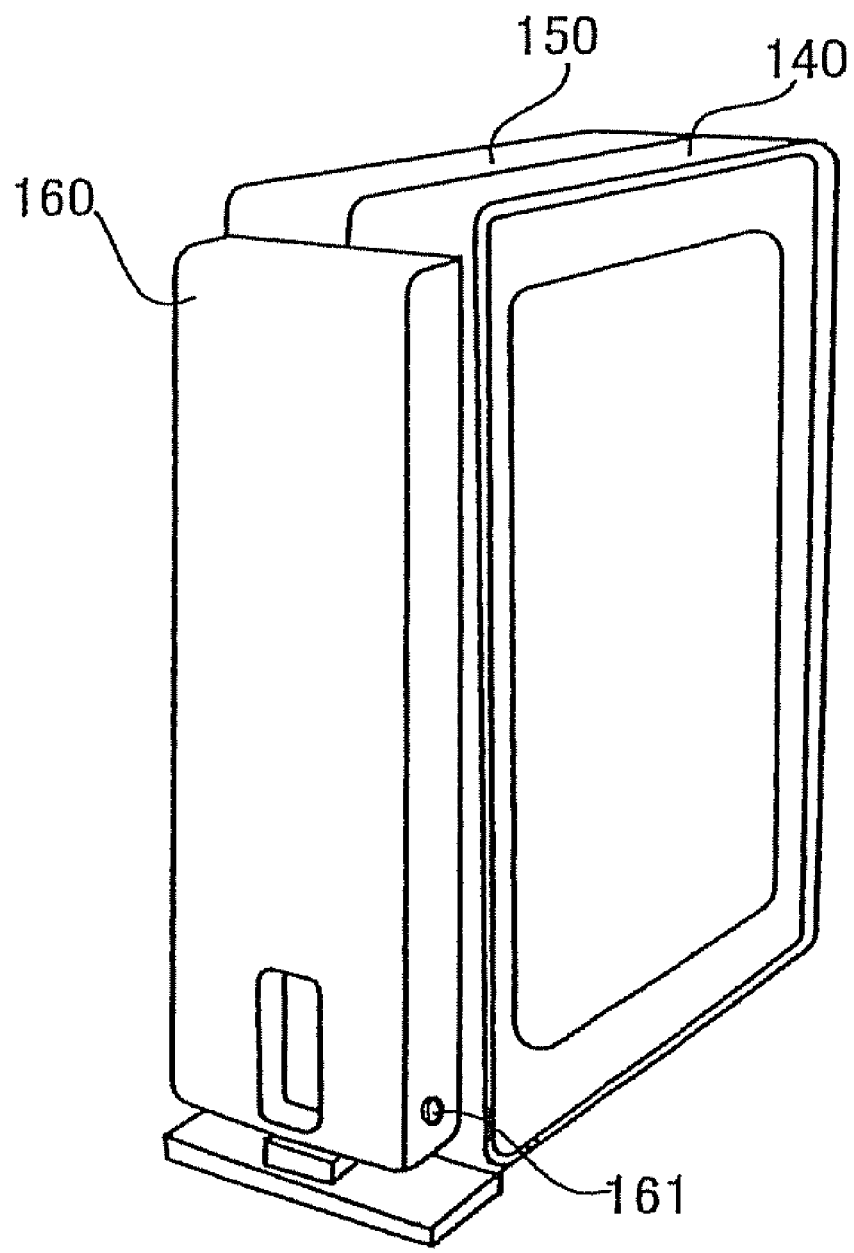
FIG. 18 is a perspective view of the example shown in FIG. 16, as viewed from a support stand.
Figure 19:
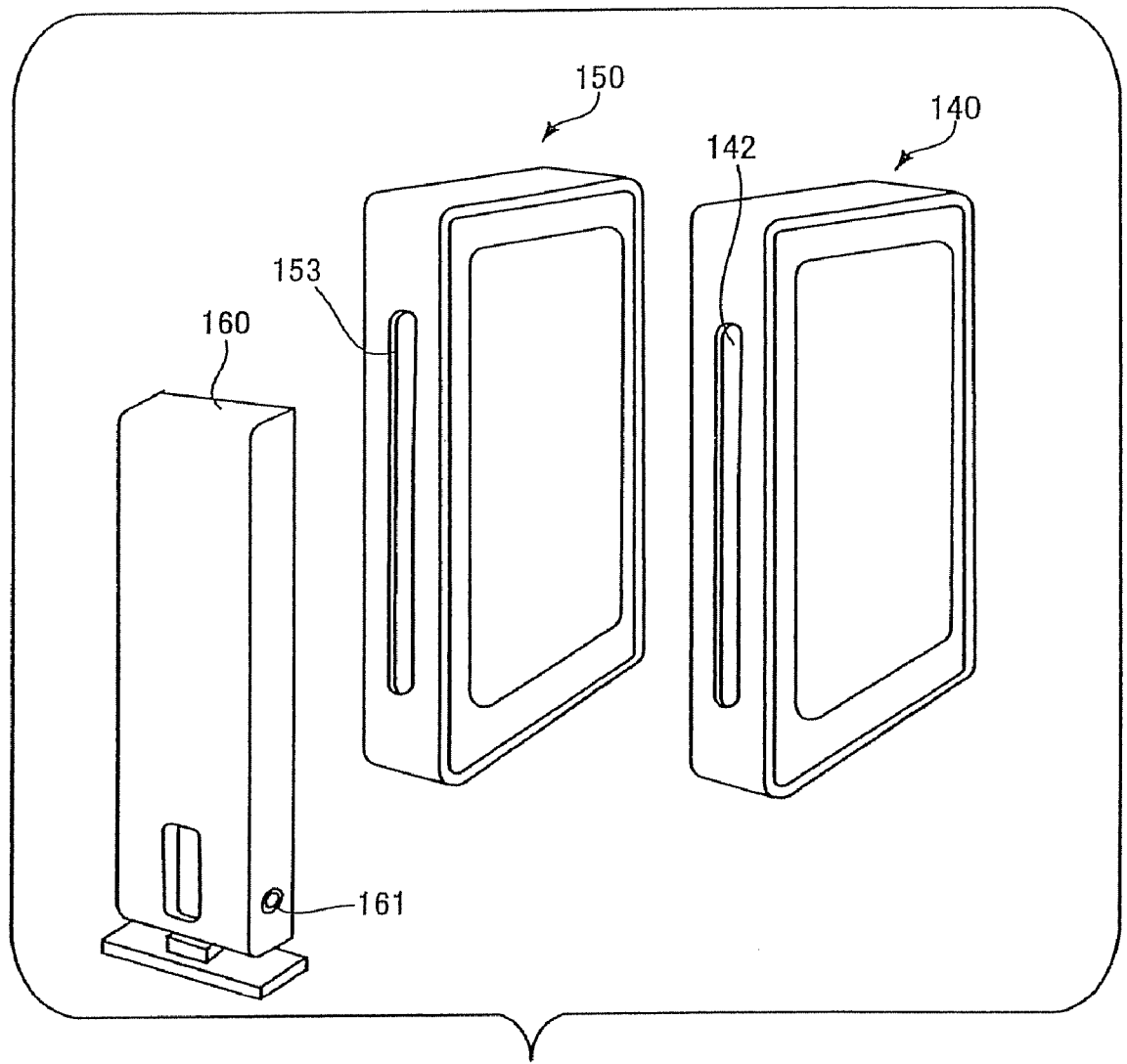
FIG. 19 is an exploded perspective view of the example shown in FIGS. 16 and 18, as viewed from the support stand.

FIG. 16 is a perspective view of an example of use of the processing unit (140) when used together with a storage unit 150 and a support stand 160. FIG. 17 is an exploded perspective view of the example shown in FIG. 16. FIG. 18 is a perspective view of the example shown in FIG. 16, as viewed from the support stand 160. FIG. 19 is an exploded perspective view of the example shown in FIGS. 16 and 18, as viewed from the support stand 160.

The example to be described with reference to these figures is composed of the processing unit 140, the storage unit 150 of the same size as the processing unit 140, and the support stand 160 for standing the processing unit 140 and the storage unit 150.

As shown in FIG. 19, the support stand 160 is provided with an AC adaptor connection section 161 and is capable of receiving power supplied from an AC adaptor through the AC adaptor connection section 161. As shown in FIG. 17, the support stand 160 has vertically running two ridges 162 and 163 that are provided with electric contacts (not shown) for supplying power to the processing unit 140 and the storage unit 150, respectively. The power received by the support stand 160 through the AC adaptor connection section 161 is supplied to the processing unit 140 and the storage unit 150 via the respective electric contacts of the ridges 162 and 163.

Disposed on one flank of the processing unit 140 is a power button 141 used to turn on the power, while formed on the other flank opposite the one flank is a channel 142 in which the vertically running ridge 162 of the support stand 160 is to be engaged. The channel 142 has an electric contact (not shown) connectable to the electric contact of the ridge 162 of the support stand 160 and thus is capable of receiving power from the support stand 160. In order to securely attach the processing unit 140 to the support stand 160 by use of magnetic force, a magnet is embedded in either one of the support stand 160 and the stand 160-facing flank of the processing unit 140, while a magnetic member (or a magnet disposed so as to have an attractive polarity) is embedded in the other.

The processing unit 140 has elements incorporated therein, such as CPU, main memory, etc. for performing processing. The processing unit 140 also has a wireless communication function of wirelessly exchanging information with the information input device 100 (see FIG. 9), the display panel 130 (see FIG. 12) and the storage unit 150 that will be described next. The processing unit 140 also has a wireless local-area network (LAN) function enabling wireless connection to a LAN.

The storage unit 150 has built-in elements such as a hard disk drive and a CD/DVD drive for accessing a CD or DVD removably inserted into the storage unit 150. The storage unit 150 also has a wireless communication function of wirelessly exchanging information with the processing unit 140.

Provided on a flank of the storage unit 150 are a power button 151 and a CD/DVD loading slot 152 into which a CD or DVD is removably inserted. Upon a press of a button 152a of the CD/DVD loading slot 152, a plate-like member on which a CD or DVD is to be placed comes out. By pushing the plate-like member back into the storage unit 150 after placing a CD or DVD on the member, the CD or DVD can be inserted into the storage unit 150. The inserted CD or DVD can be removed in a similar manner.

On a flank opposite the flank where the power button 151 is disposed, the storage unit 150 has the vertically running channel 153 in which the vertically running ridge 163 of the support stand 160 is to be engaged, as in the case of the processing unit 140. The channel 153 has an electric contact (not shown) connectable to the electric contact of the ridge 163 of the support stand 160 and thus is capable of receiving power from the support stand 160.

As also in the case of the processing unit 140, in order to securely attach the storage unit 150 to the support stand 160 by use of magnetic force, a magnet is embedded in either one of the support stand 160 and the stand 160-facing flank of the storage unit 150, while a magnetic member (or a magnet disposed so as to have an attractive polarity) is embedded in the other.

In the above description, the processing unit 140 is coupled to the support stand 160 via the ridge 162, while the storage unit 150 is coupled to the support stand 160 via the ridge 163. The two ridges 162 and 163 are structurally the same, and the channel 142 of the processing unit 140 and the channel 153 of the storage unit 150 are also structurally the same. Similarly, the processing unit 140 and the storage unit 150 are also structurally the same in terms of magnetic attraction. Therefore, it is possible to couple the storage unit 150 to the support stand 160 via the ridge 162 and to couple the processing unit 140 to the support stand 160 via the ridge 163, in reverse.

Figure 20:
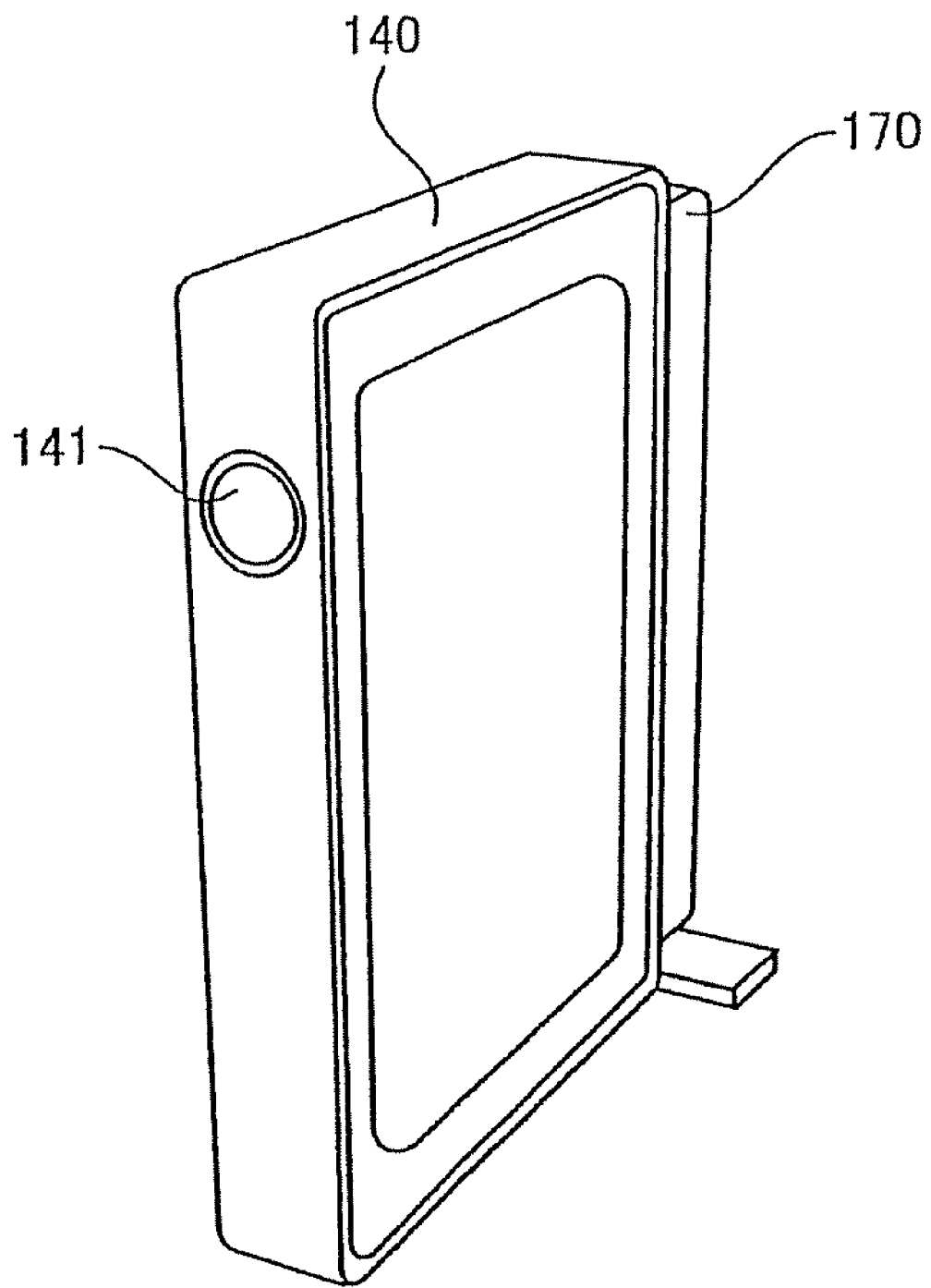
FIG. 20 is a perspective view of another example of use of the processing unit.
Figure 21:
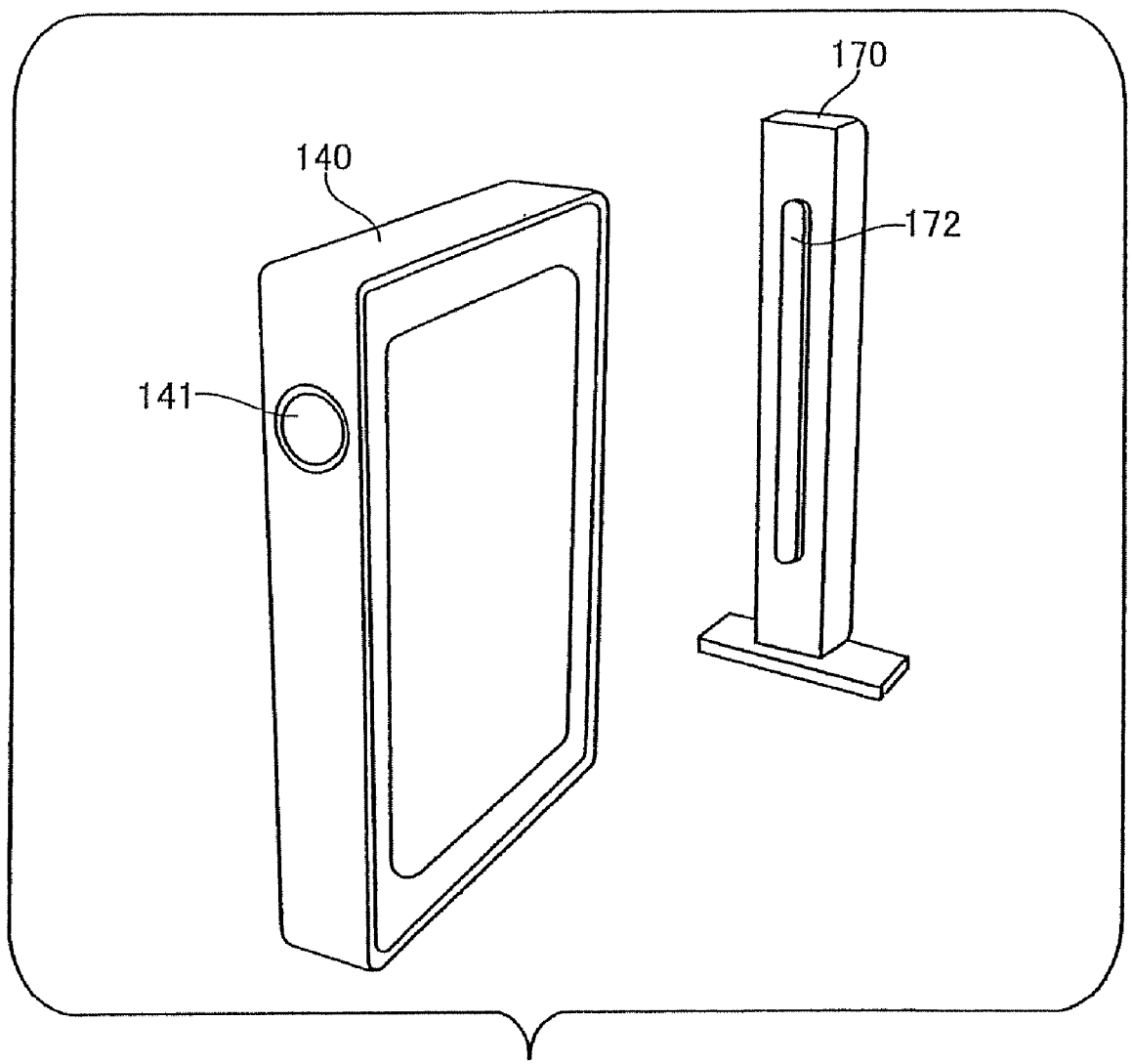
FIG. 21 is an exploded perspective view of the example shown in FIG. 20.
Figure 22:
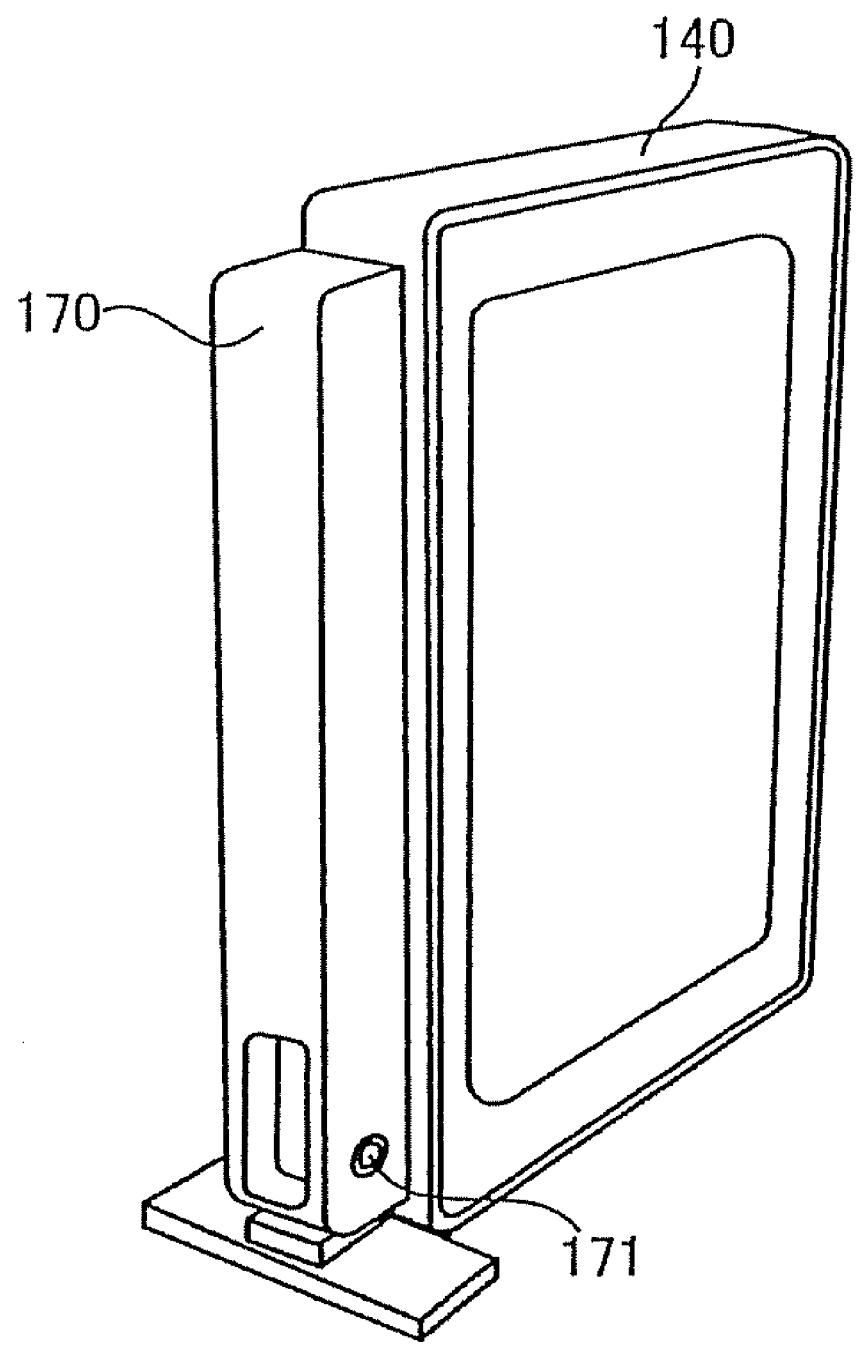
FIG. 22 is a perspective view of the example shown in FIG. 22, as viewed from a support stand.
Figure 23:
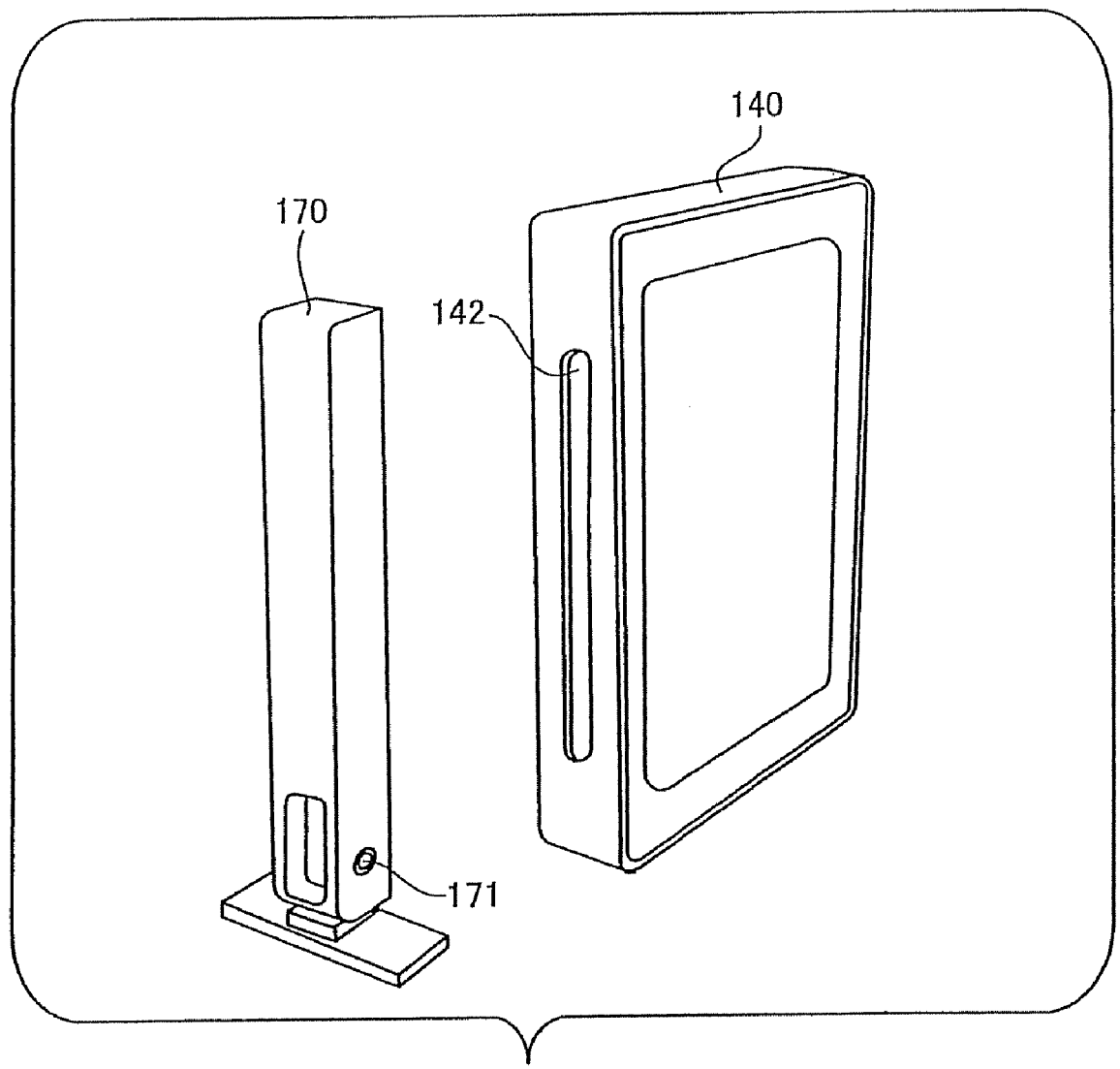
FIG. 23 is an exploded perspective view of the example shown in FIGS. 20 and 22, as viewed from the support stand.

FIG. 20 is a perspective view of another example of use of the processing unit 140 when used together with a support stand 170. FIG. 21 is an exploded perspective view of the example shown in FIG. 20. FIG. 22 is a perspective view of the example shown in FIG. 22, as viewed from the support stand 170. FIG. 23 is an exploded perspective view of the example shown in FIGS. 20 and 22, as viewed from the support stand 170.

The processing unit 140 shown in FIGS. 20 through 23 is the same as the processing unit 140 described with reference to FIGS. 16 through 19 and therefore, the description of the processing unit 140 will be omitted and only the support stand 170 provided in place of the support stand 160 will be described.

Although the support stand 160 described with reference to FIGS. 16 through 19 is so configured as to stand and supply power to the two units: the processing unit 140 and the storage unit 150, the support stand 170 shown in FIGS. 20 through 23 is so configured as to stand and supply power to the processing unit 140 only.

Specifically, the support stand 170 has an AC adaptor connection port 171 as shown in FIGS. 22 and 23, and also has a vertically running ridge 172 as shown in FIG. 21. The ridge 172 is structurally the same as the two ridges 162 and 163 of the support stand 160 shown in FIG. 17 and has an electric contact (not shown) for supplying power to the processing unit 140. Also, the support stand 170 is structurally similar to the support stand 160 described with reference to FIGS. 16 through 19, in terms of magnetic attraction with respect to the processing unit 140.

When the information processing device described here is used as a thin client, the storage unit 150 is not necessary and thus, it is possible to stand and use the processing unit 140 alone by means of the support stand 170.

Incidentally, the support stand 170 has been described so far, as a support stand for standing the processing unit 140 alone. However, as described above, the processing unit 140 and the storage unit 150 are compatible with each other in the way they are attached to the support stand 160. For this reason, the support stand 170 may be used as a support stand for supporting the storage unit 150. Accordingly, when two support stands 170 are provided, it is possible to use one for standing the processing unit 140 and the other for standing the storage unit 150, thereby placing the processing unit 140 and the storage unit 150 in different locations.

Figure 24:
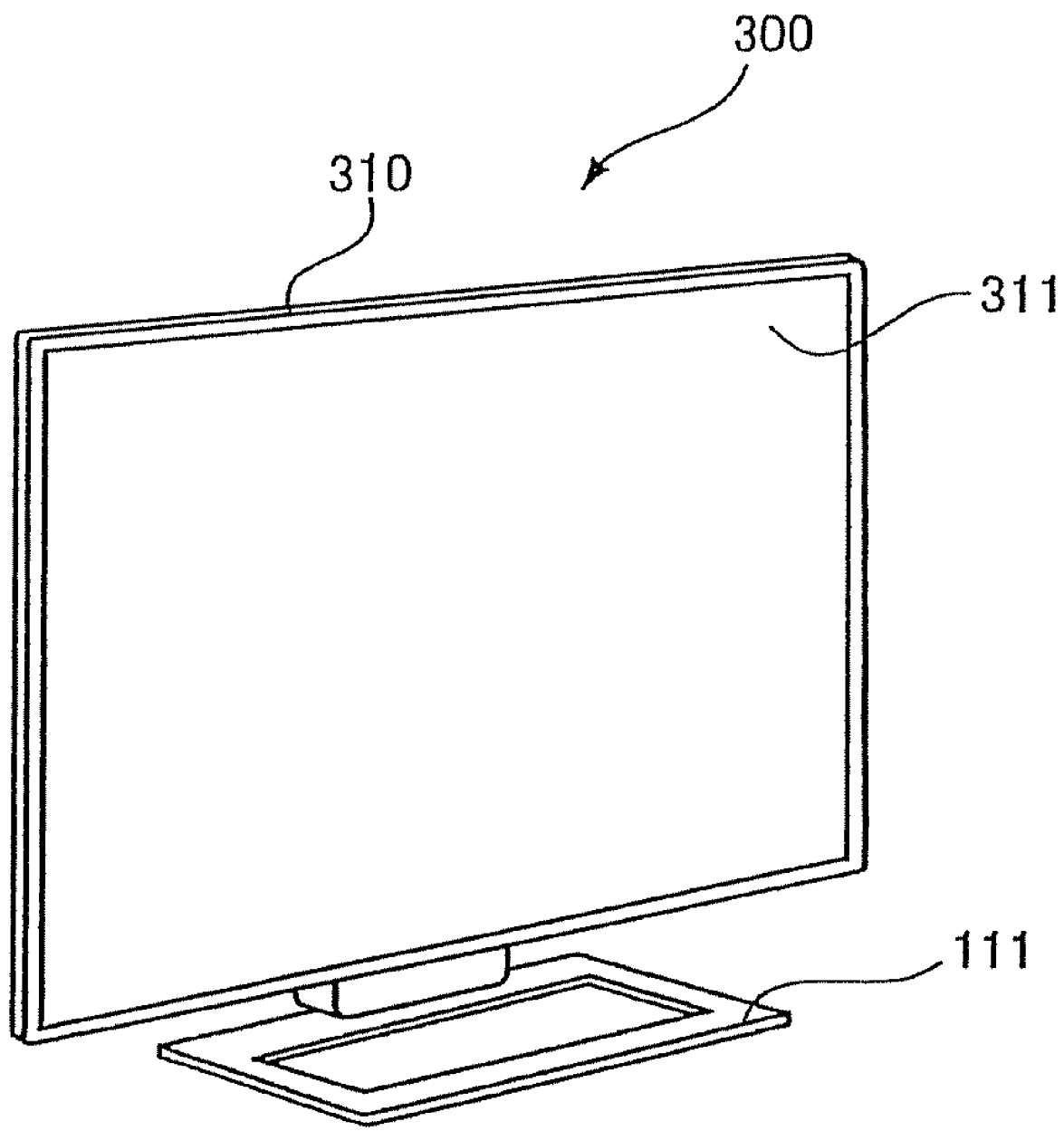
FIG. 24 is a perspective view of a second example of the display component, as viewed from the front.
Figure 25:
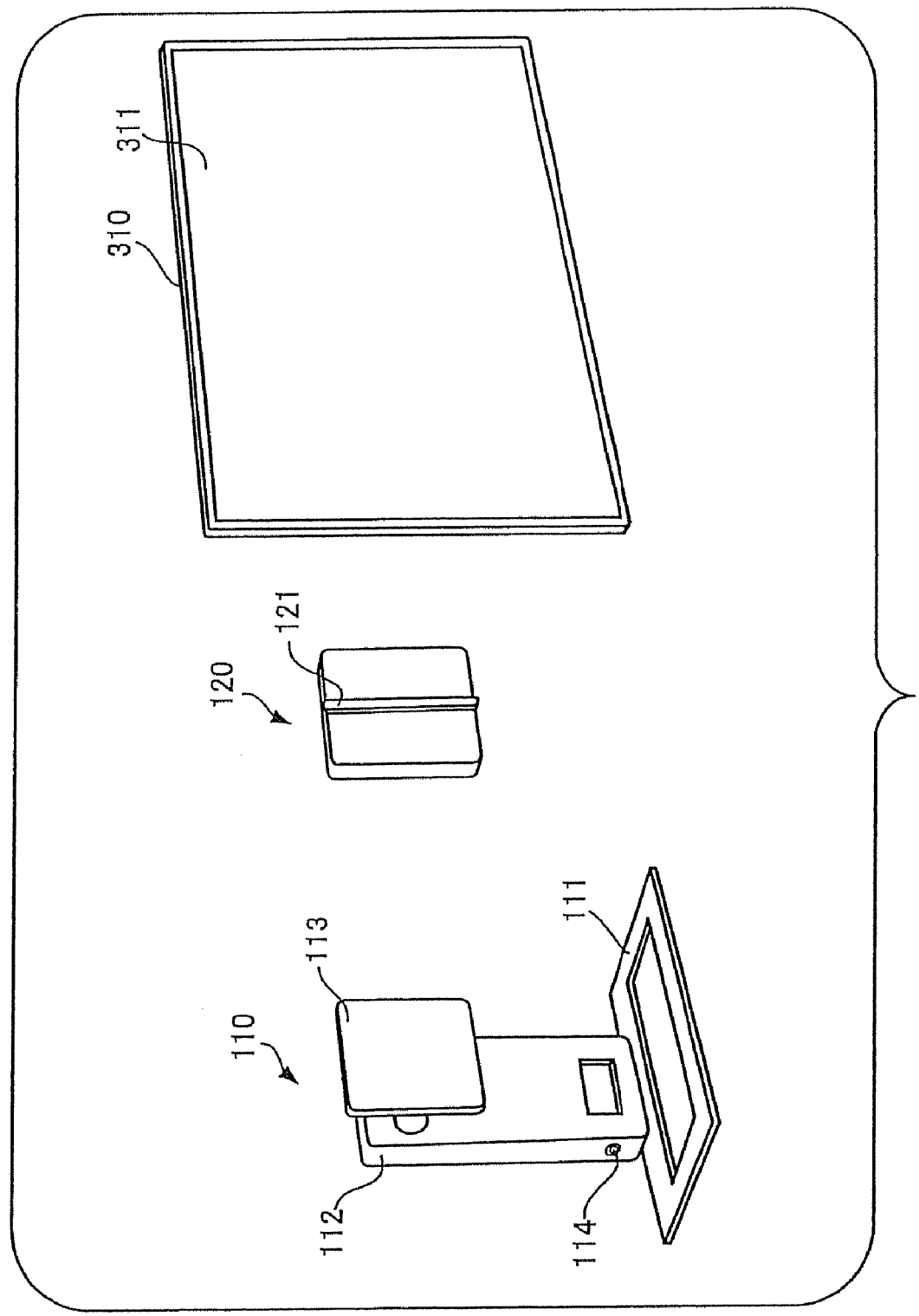
FIG. 25 is an exploded perspective view of the display component shown in FIG. 24, as viewed from the front.
Figure 26:
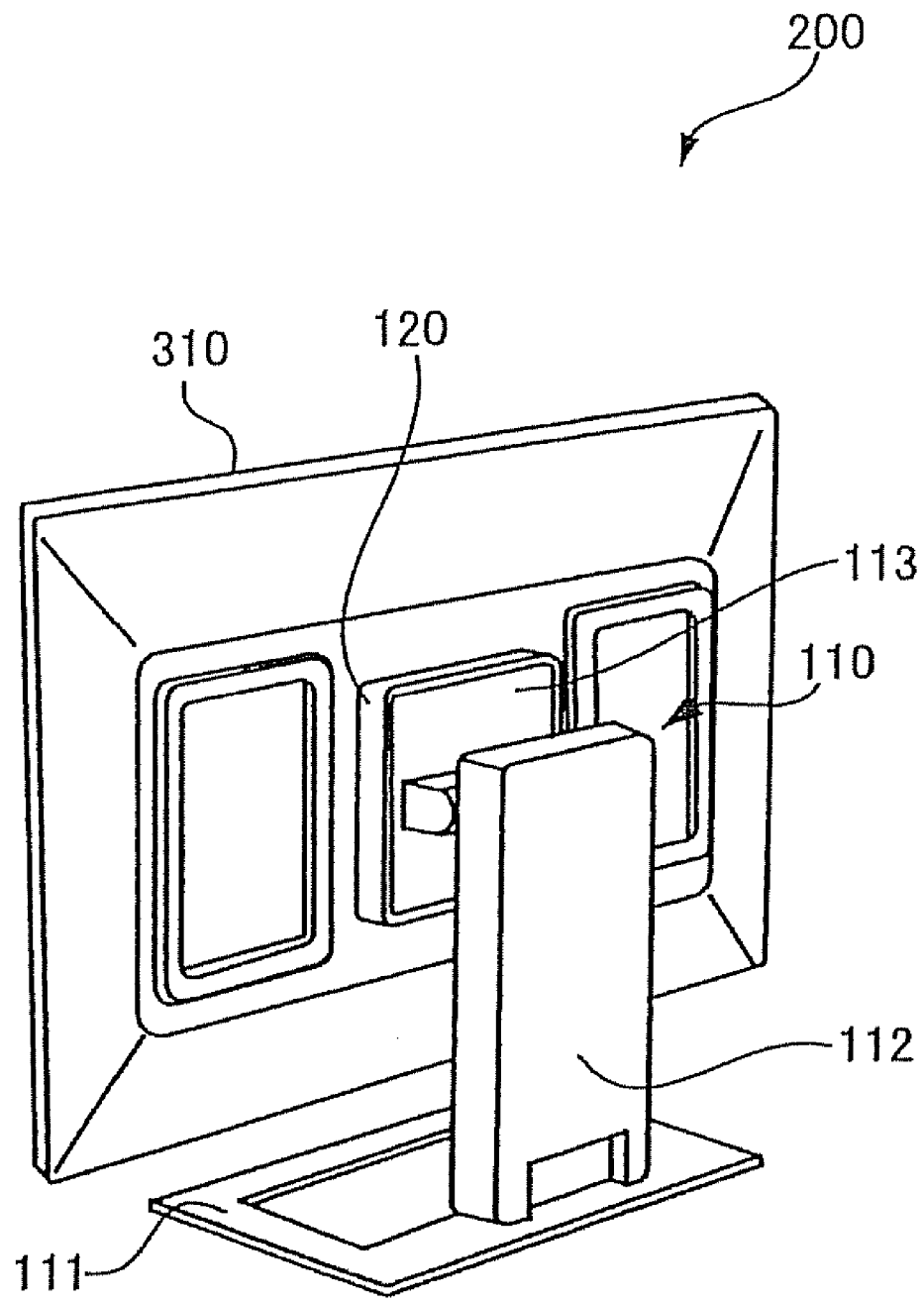
FIG. 26 is a perspective view of the display component shown in FIG. 24, as viewed from the back.
Figure 27:
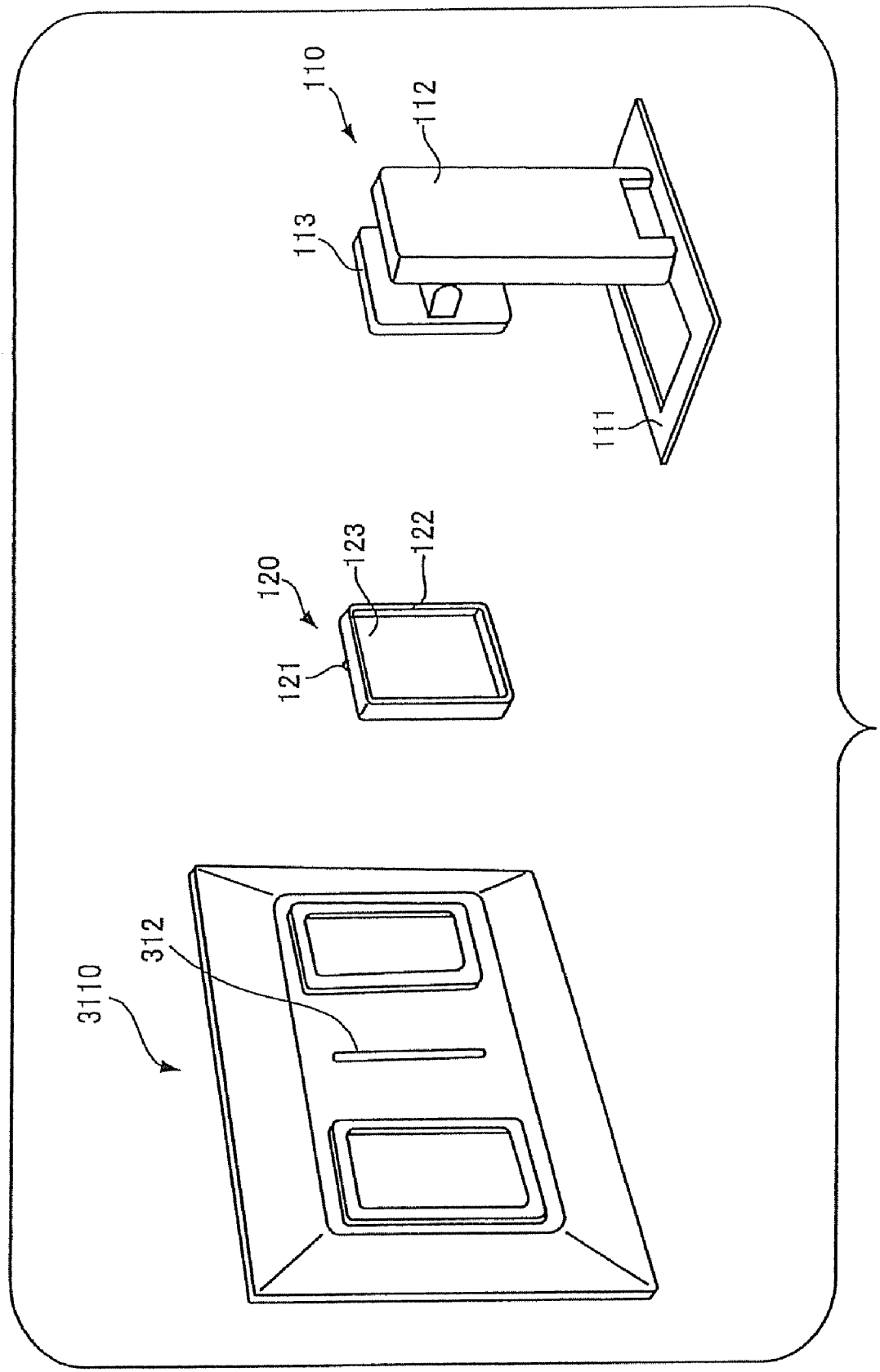
FIG. 27 is an exploded perspective view of the display component shown in FIGS. 24 and 26, as viewed from the back.

FIG. 24 is a perspective view of a second example of the display component in a combined state, as viewed from the front. FIG. 25 is an exploded perspective view of the display component shown as the second example in FIG. 24, as viewed from the front. FIG. 26 is a perspective view of the display component shown in FIG. 24, as viewed from the back. FIG. 27 is an exploded perspective view of the display component shown in FIGS. 24 and 26, as viewed from the back.

The display component shown in FIGS. 24 through 27 is a display component 300 having a support stand 110, a first adaptor 120 and a display panel 310. The support stand 110 and the first adaptor 120 in the second example are similar to those of the display component 200 described above as the first example with reference to FIGS. 12 through 15 and thus will not be described. The following description will focus on the display panel 310.

The display panel 310 is structurally about the same as the display panel 130 of the display component 200 shown in FIGS. 12 through 15 except that the display panel 310 is larger in size than the display panel 130.

The display panel 310 has a display screen 311 on the front face. On the center of the back face of the display panel 310, there is formed a channel 312 in the same shape as the channel 132 of the display panel 130 used in the display component 200 shown in FIGS. 12 through 15. The channel 312 is formed such that a ridge 121 that runs vertically on a surface of the first adaptor 120 that faces display panel 310 can be engaged in the channel 312. The channel 312 is provided with an electric contact (not shown) for receiving power supply. When the display panel 310 is attached to the first adaptor 120 by engaging the ridge 121 of the first adaptor 120 in the channel 312, the electric contact provided in the ridge 121 of the first adaptor 120 is brought into contact with the electric contact provided in the channel 312 of the display panel 310, so that power is supplied to the display panel 310 through these electric contacts.

The display panel 310 is also similar to the display panel 130 of the display component 200 shown in FIGS. 12 through 15, in terms of magnetic attraction. A magnet or a magnetic member is embedded in the display panel 310, so that the display panel 310 can be attached to the first adaptor 120 through magnetic attraction.

As described above, the two different types of display panels 130 and 310 are provided in the present embodiment. Therefore, it is possible to support either of these display panels 130 and 310 with the support stand 110 via the first adaptor 120.

Figure 28:
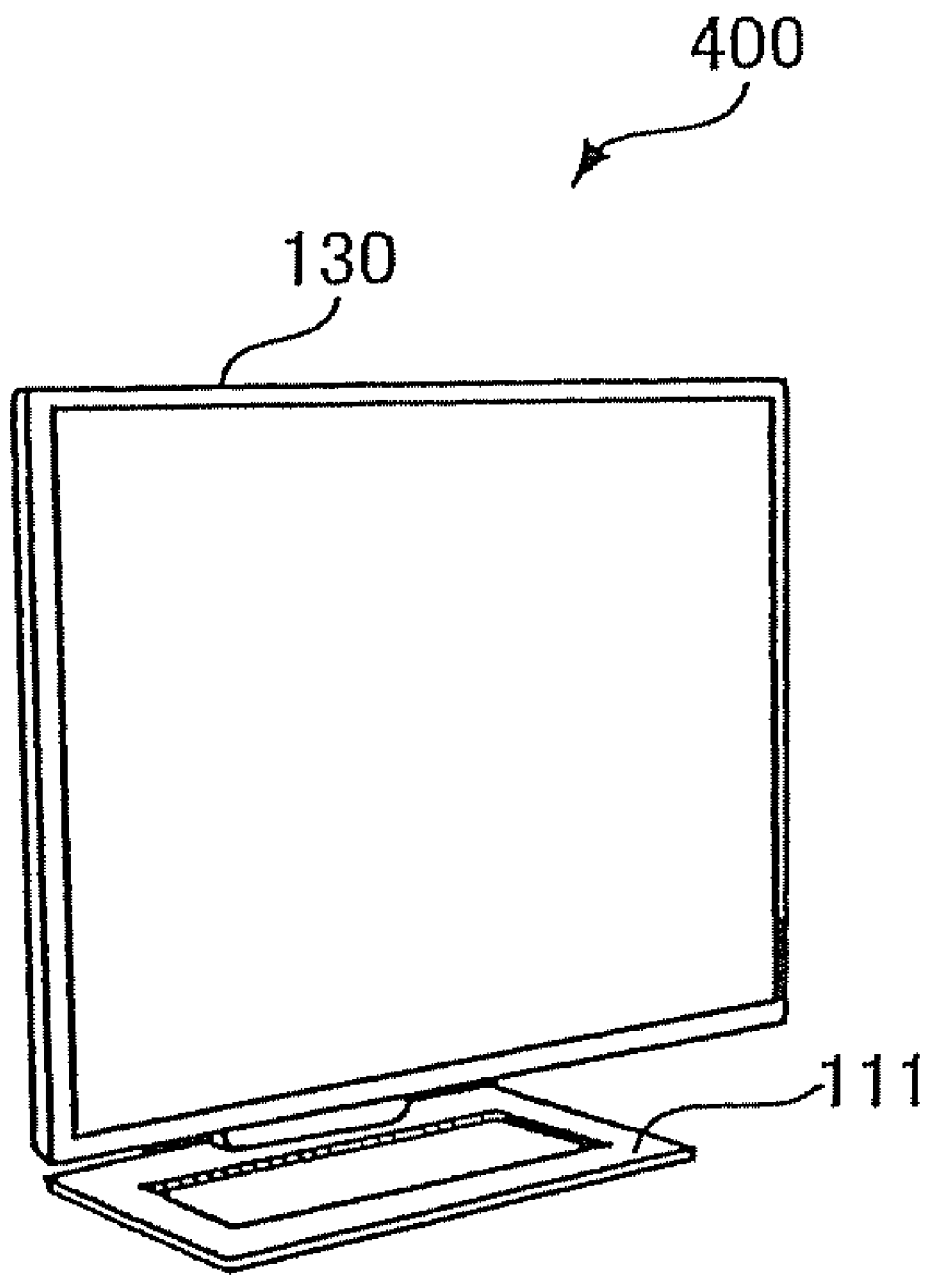
FIG. 28 is a perspective view of a display-and-processing component shown as a second example of the information processing device.

FIG. 28 is a perspective view of a second example of the information processing device.

In this example, units similar to the above-described processing unit 140, storage unit 150 and display panel 130 are all supported by a stand similar to the support stand 110. The second example having such a structure will be referred to as a "display-and-processing component" (will also be described as a first example of the display-and-processing component).

Figure 29:
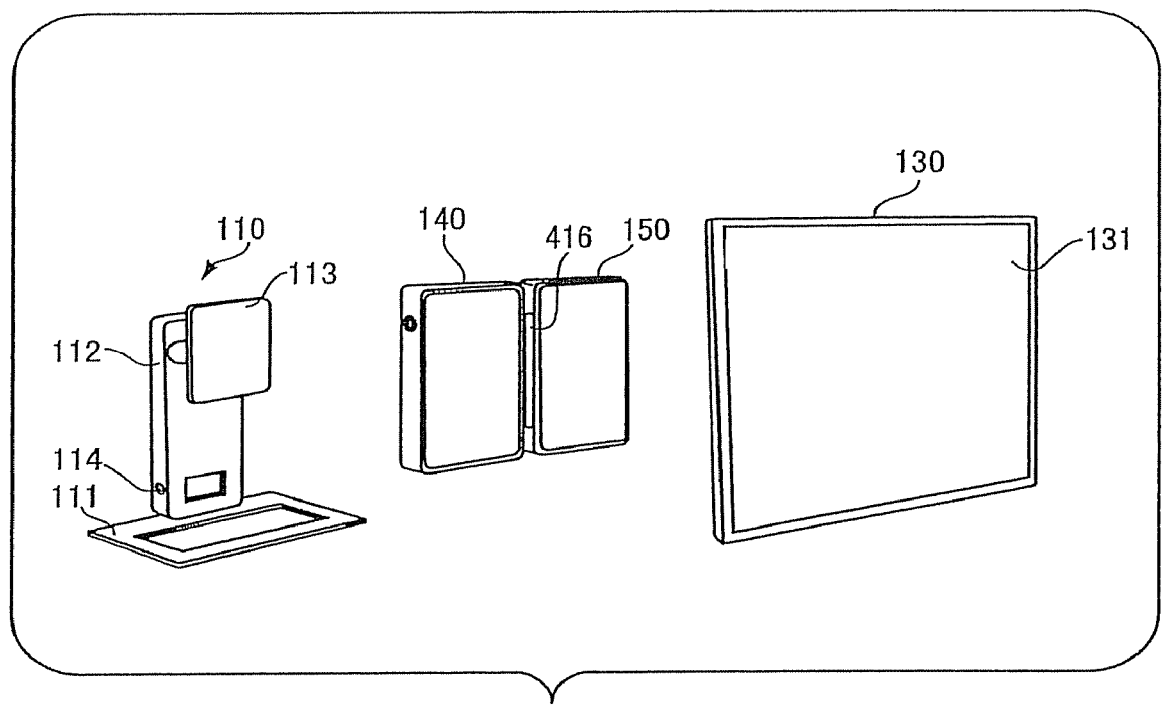
FIG. 29 is an exploded perspective view of the display-and-processing component shown in FIG. 28, as viewed from the front.
Figure 30:
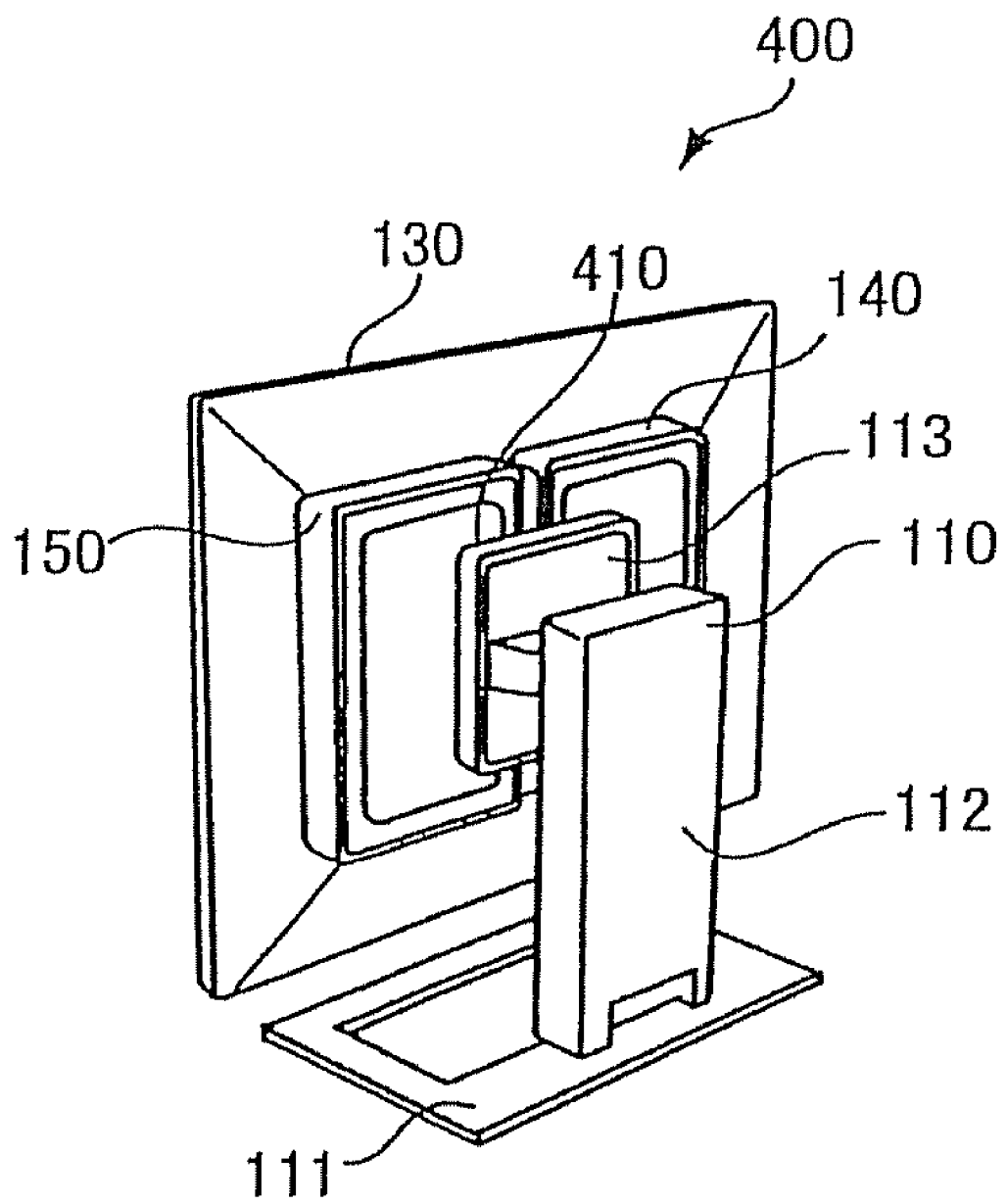
FIG. 30 is a perspective view of the display-and-processing component shown in FIG. 28, as viewed from the back.
Figure 31:
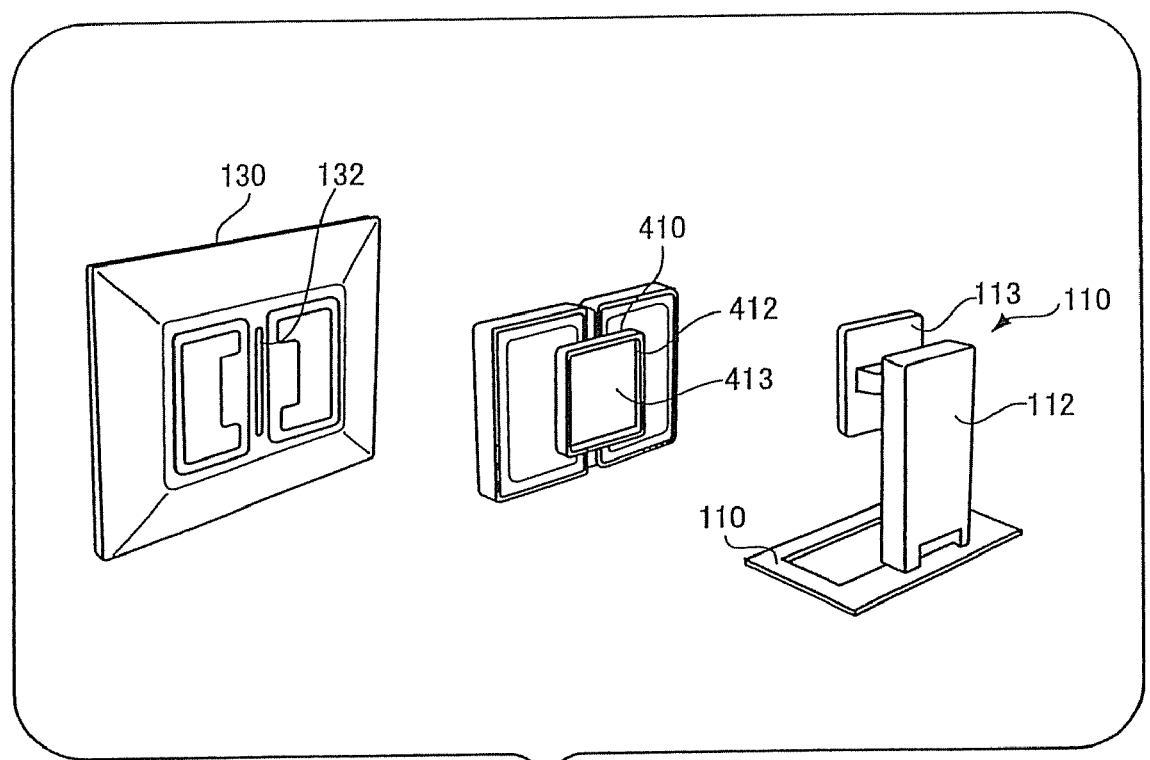
FIG. 31 is an exploded perspective view of the display-and-processing component shown in FIGS. 28 and 30, as viewed from the back.

FIG. 29 is an exploded perspective view of the display-and-processing component shown in FIG. 28, as viewed from the front. FIG. 30 is a perspective view of the display-and-processing component shown in FIG. 28, as viewed from the back. FIG. 31 is an exploded perspective view of the display-and-processing component shown in FIGS. 28 and 30, as viewed from the back.

The display-and-processing component shown in FIGS. 28 through 31 is a display-and-processing component 400 having a support stand 110, a second adaptor 410, a processing unit 140, a storage unit 150 and a display panel 130.

The support stand 110 and the display panel 130 are similar to those of the display component 200 described with reference to FIGS. 12 through 15 and thus will not be described. The following description will focus on the second adaptor 410 and how the second adaptor 410 supports the processing unit 140 and the storage unit 150.

Figure 32:
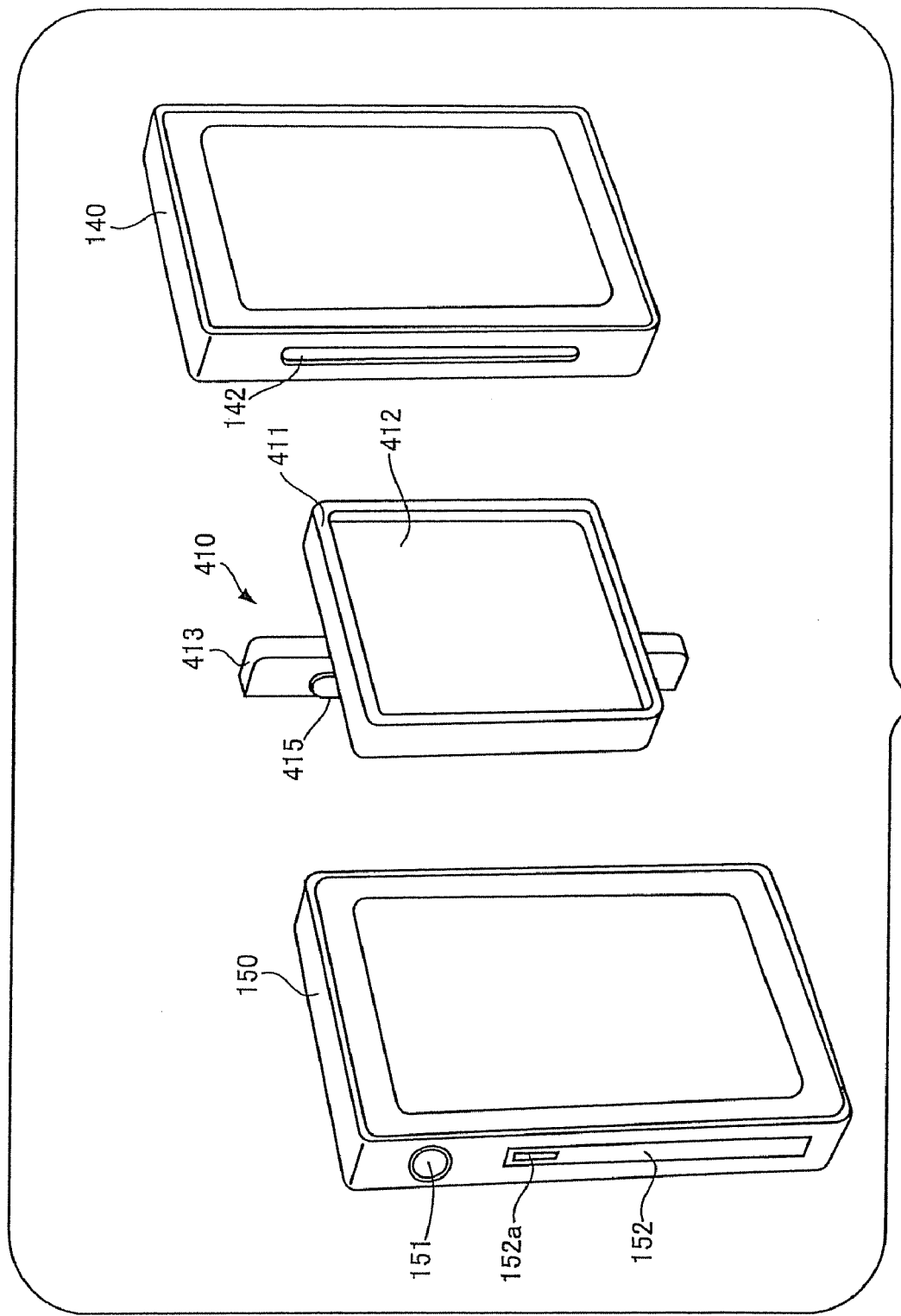
FIG. 32 is a perspective view of a second adaptor, a processing unit and a storage unit when detached from each other, as viewed from a support stand side.
Figure 33:
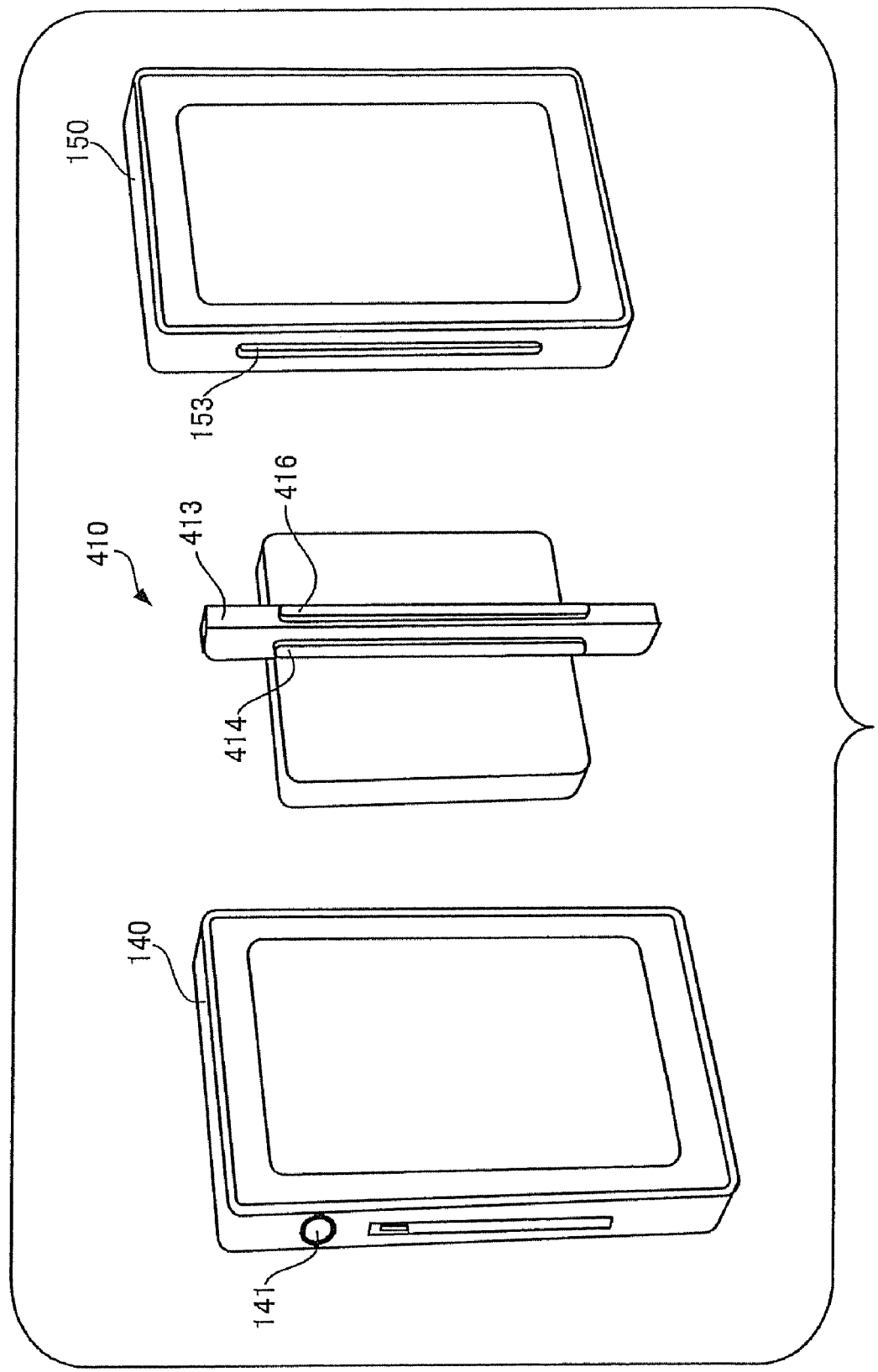
FIG. 33 is a perspective view of the second adaptor, the processing unit and the storage unit when detached from each other, as viewed from a display panel.

FIGS. 32 and 33 are perspective views of the second adaptor 410, the processing unit 140 and the storage unit 150 when detached from each other, as viewed from the support stand 110 and the display panel 130, respectively.

An adaptor that enables the support stand 110 (see FIG. 29) to support not only the display panel 130 but also the processing unit 140 and the storage unit 150 is referred to as a second adaptor, and exemplified here by the second adaptor 410.

The second adaptor 410 shown in FIGS. 32 and 33 has the same shape as the first adaptor 120 of the display component 200 described with reference to FIGS. 12 through 15, in the surface viewed from the support stand 110. Specifically, as shown in FIG. 32, the second adaptor 410 has, in the surface facing the support stand 110, a rectangular recess 412 that is surrounded by a projecting frame 411 and that a rectangular link 113 of the support stand 110 is to be engaged in. The link 113 of the support stand 110 has an electric contact as in the case of the example described above, while the recess 412 of the second adaptor 410 has an electric contact in the same pattern as the electric contact of the link 113. Therefore, when the second adaptor 410 is attached to the support stand 110 by engaging the link 113 in the recess 412, power received by an AC adaptor connection port 114 of the support stand 110 is supplied to the second adaptor 410 through these electric contacts. The power is then further supplied to the display panel 130, the processing unit 140 and the storage unit 150 as will be described later.

Meanwhile, as shown in FIG. 33, the second adaptor 410 has a support pole 413 standing along the surface facing the display panel 130. The support pole 413 has vertically running ridges 414 and 415 formed on its both flanks and a vertically running ridge 416 formed on its front surface facing the display panel 130.

These three ridges 414, 415 and 416 are formed to be engaged in a channel 142 (see FIG. 32) of the processing unit 140, a channel 153 (see FIG. 33) of the storage unit 150 and a channel 132 (see FIG. 31) formed on the back face of the display panel 130. These three ridges 414, 415 and 416 are each provided with an electric contact (not shown) and thus, power supplied from the support stand 110 to the second adaptor 410 is further supplied to the processing unit 140, the storage unit 150 and the display panel 130 via the electric contacts of the ridges 414, 415 and 416.

The second adaptor 410 has a structure similar to the first adaptor 120 attachable to the support stand 110 (see FIGS. 13 and 15), in terms of magnetic attraction. Therefore, the second adaptor 410 can be attracted to the support stand 110 by magnetic force.

The processing unit 140 and the storage unit 150 are magnetically attractable to the second adaptor 410, while the display panel 130 is magnetically attractable to the processing unit 140 and the storage unit 150.

Figure 34:
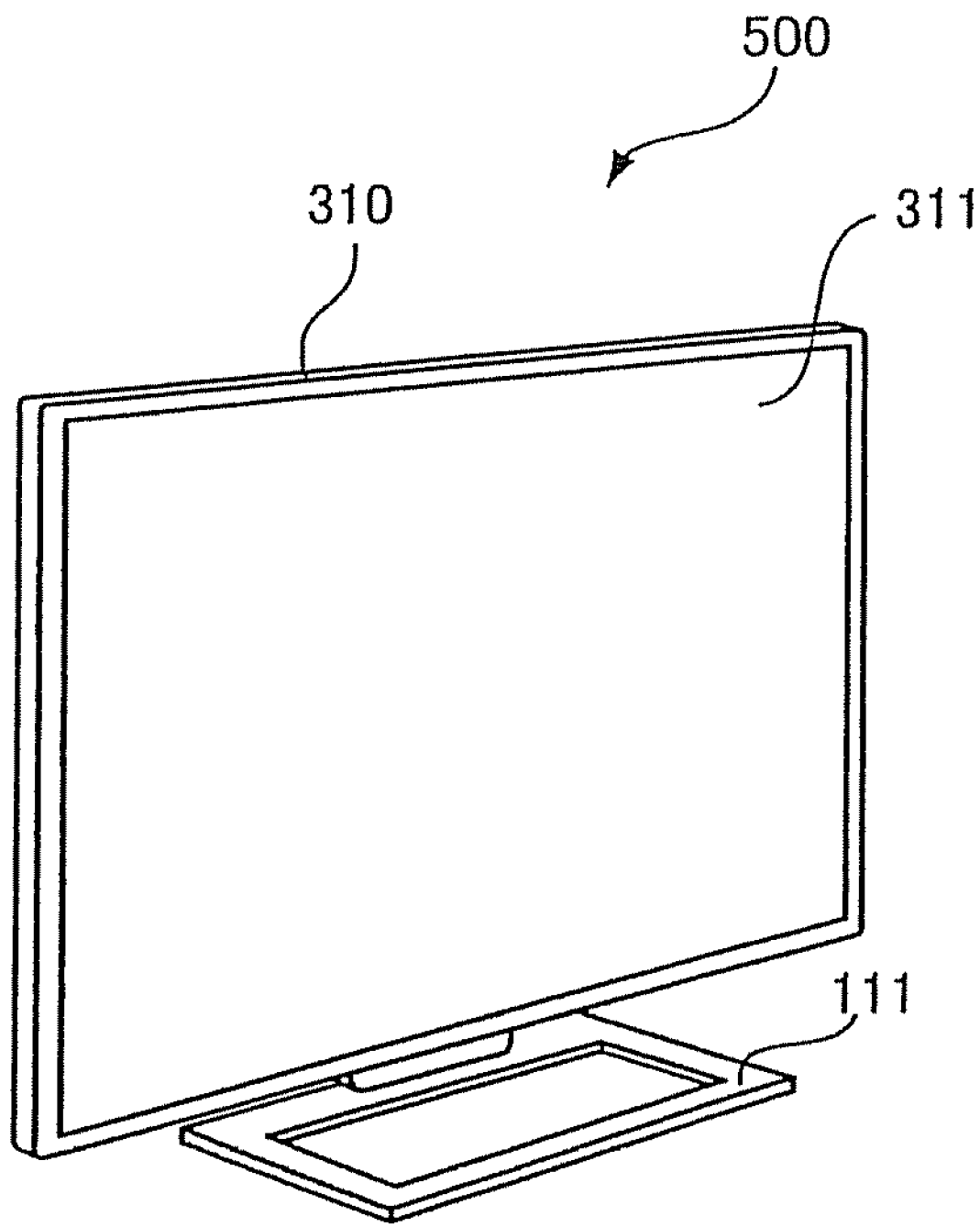
FIG. 34 is a perspective view of a second example of the display-and-processing component, as viewed from the front.
Figure 35:
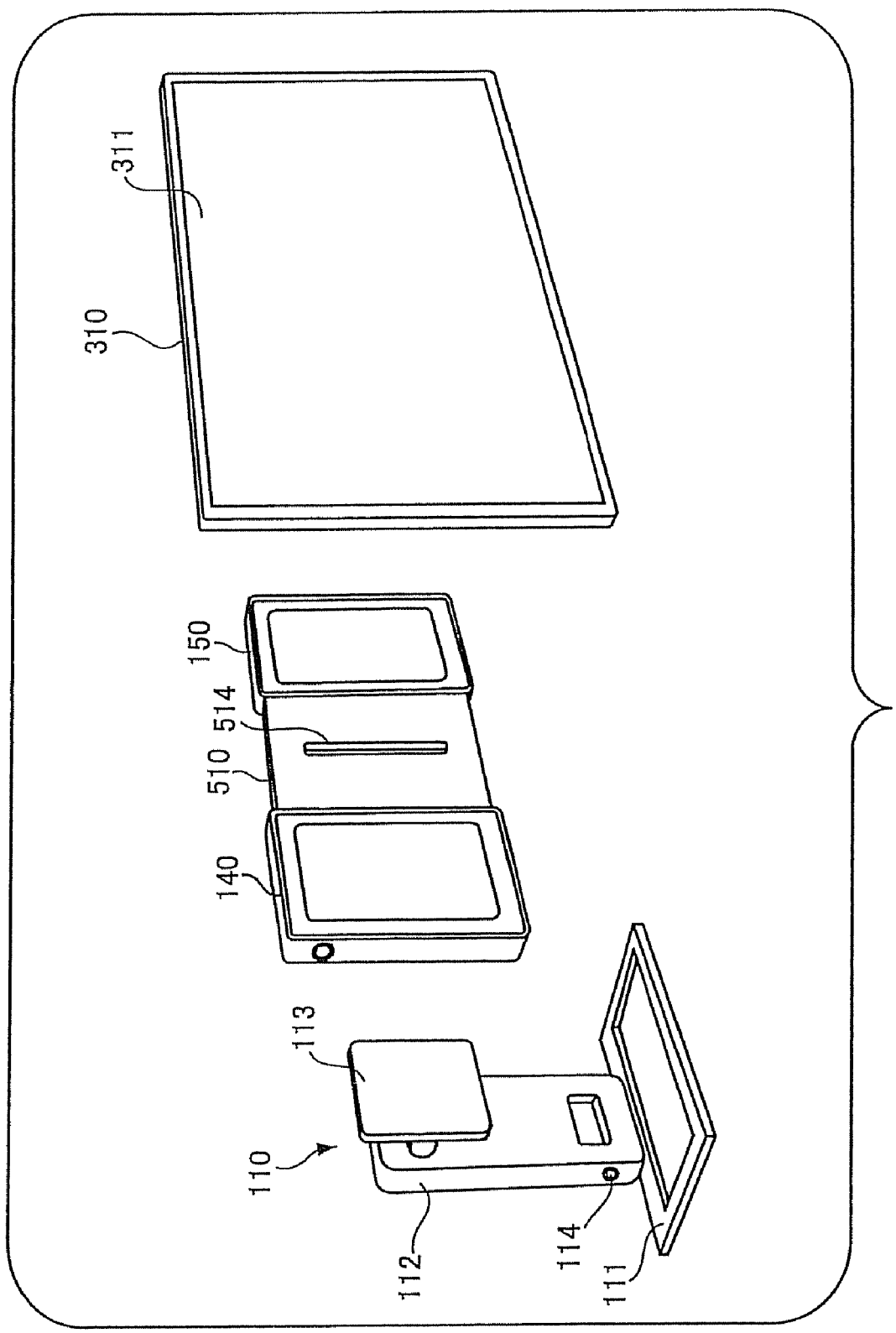
FIG. 35 is an exploded perspective view of the display-and-processing component shown in FIG. 34, as viewed from the front.
Figure 36:
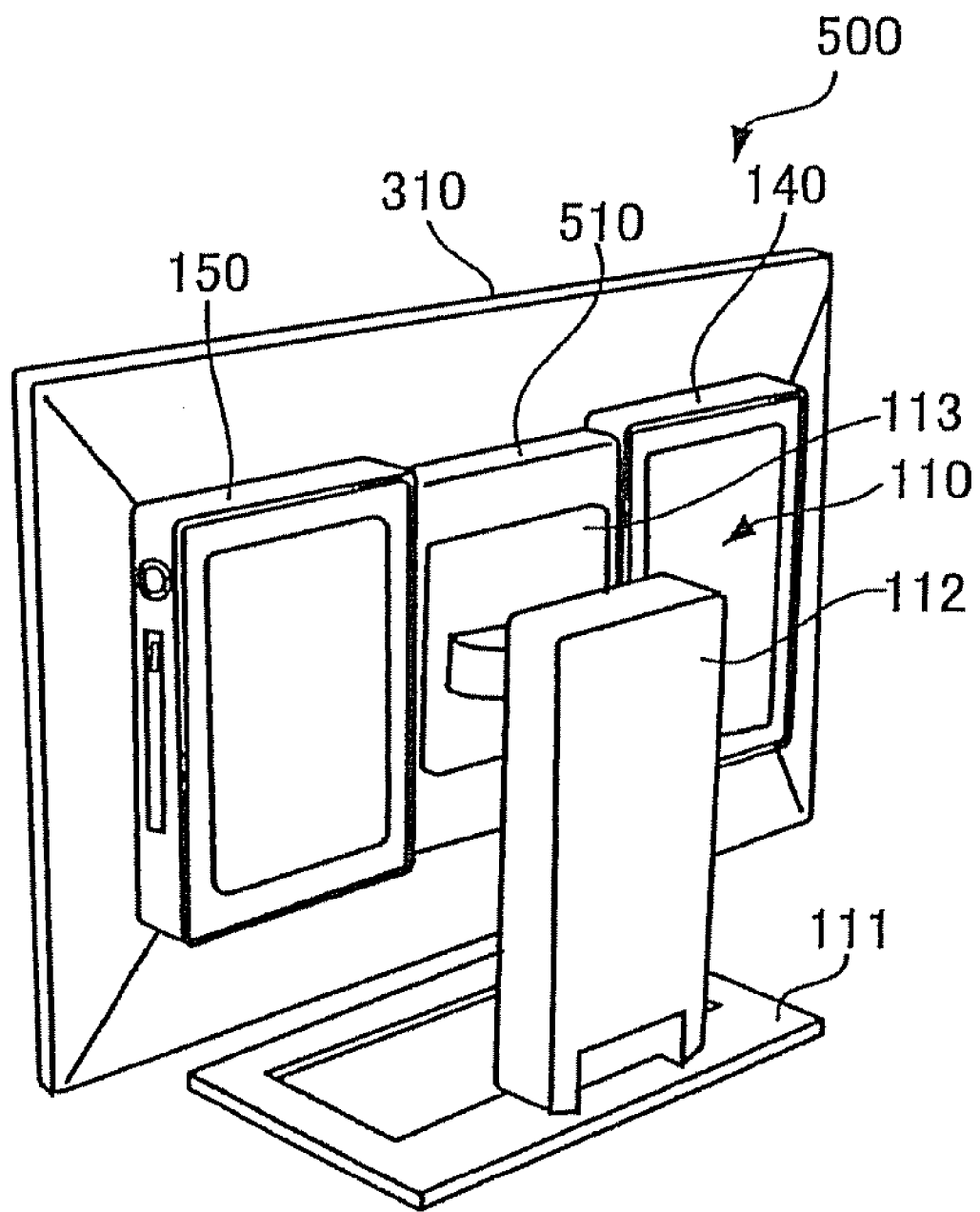
FIG. 36 is a perspective view of the display-and-processing component shown in FIG. 34, as viewed from the back.
Figure 37:
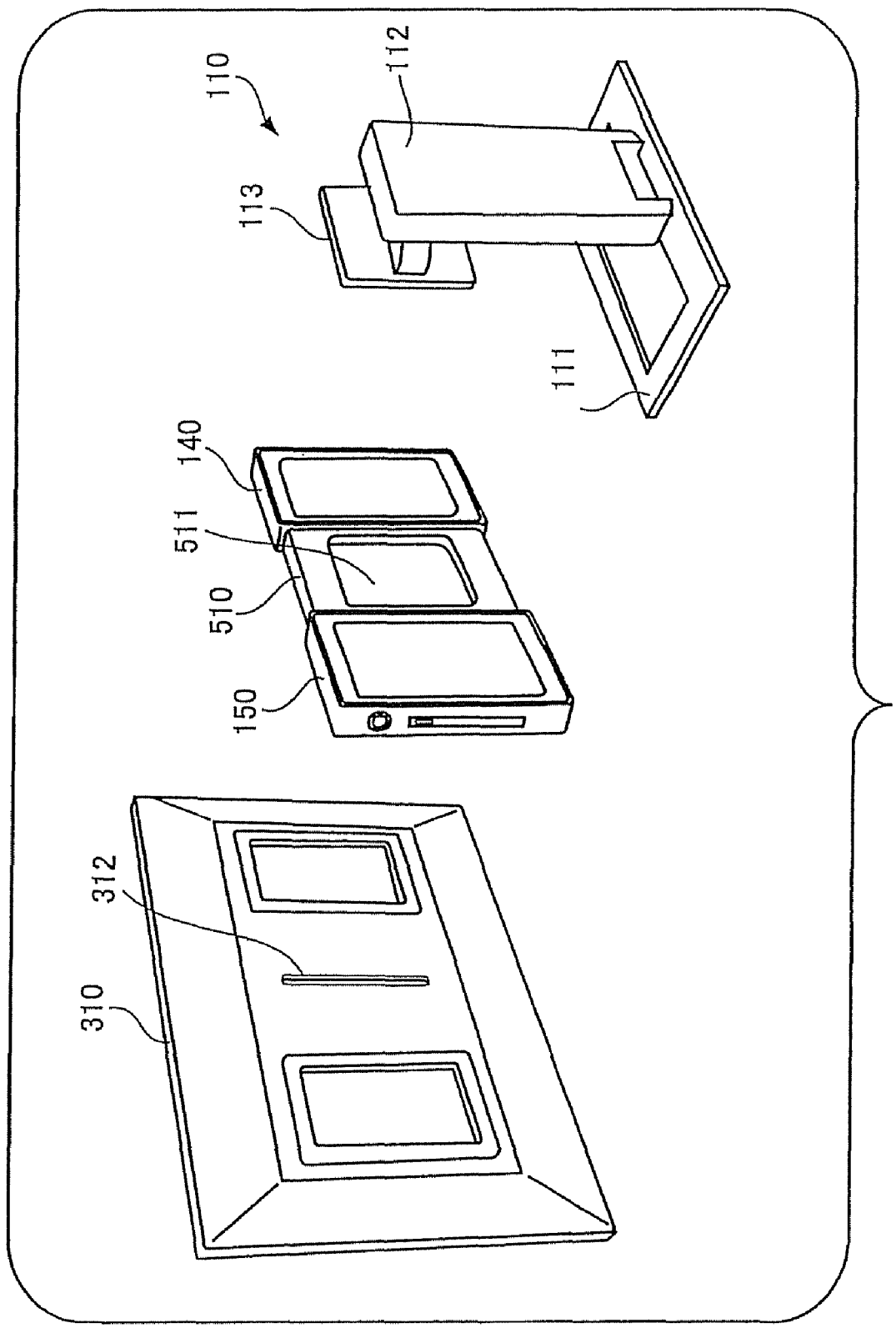
FIG. 37 is an exploded perspective view of the display-and-processing component shown in FIGS. 34 and 36, as viewed from the back.

FIG. 34 is a perspective view of a second example of the display-and-processing component as viewed from the front. FIG. 35 is an exploded perspective view of the display-and-processing component shown in FIG. 34, as viewed from the front. FIG. 36 is a perspective view of the display-and-processing component shown in FIG. 34, as viewed from the back. FIG. 37 is an exploded perspective view of the display-and-processing component shown in FIGS. 34 and 36, as viewed from the back.

The display-and-processing component shown in FIGS. 34 through 37 is a display-and-processing component 500 having a support stand 110, a second adapter 510, a processing unit 140, a storage unit 150 and a display panel 310. Among them, the support stand 110, the processing unit 140 and the storage unit 150 are similar to those of the display-and-processing component 400 described above as the first example with reference to FIGS. 28 through 33, and thus will not be described. Also, the display panel 310 is similar to that of the display component 300 described with reference to FIGS. 24 through 27, and thus will not be described.

Accordingly, the following description will focus on the second adapter 510 and how the second adapter 510 supports the processing unit 140 and the storage unit 150.

As mentioned above, an adaptor that enables the support stand to support not only the display panel but also the processing unit and the storage unit is referred to as a second adaptor. The second adaptor 510 of the display-and-processing component 500 shown in FIGS. 34 through 37 is also an example of the second adaptor.

Figure 38:
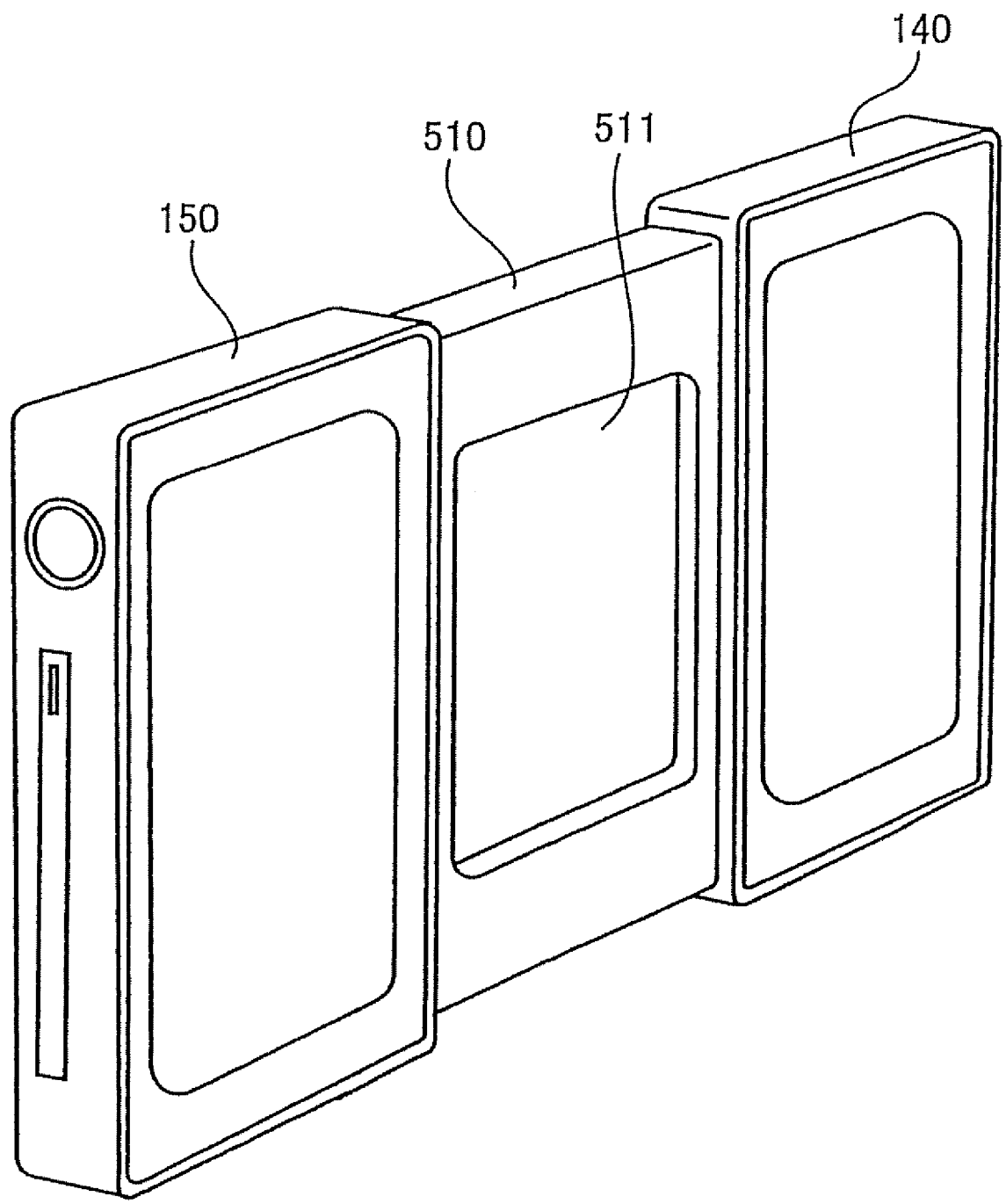
FIG. 38 is a perspective view of a second adaptor employed in the display-and-processing component shown in FIGS. 34 through 37, and the processing unit and the storage unit attached to the second adaptor.
Figure 39:
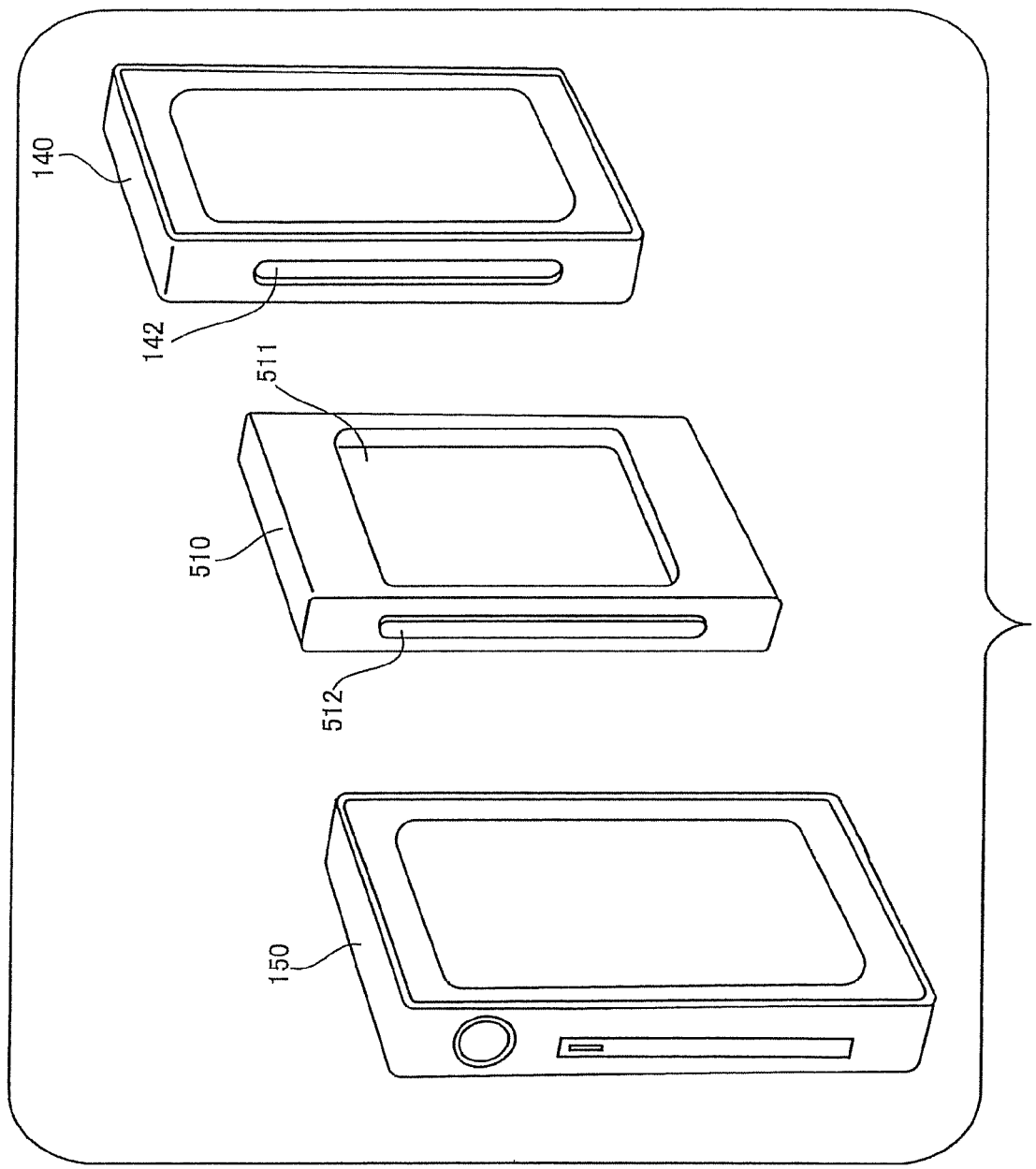
FIG. 39 is an exploded perspective view of the second adaptor, the processing unit and the storage unit shown in FIG. 38.

FIG. 38 is a perspective view of the second adaptor 510 employed in the display-and-processing component 500 shown in FIGS. 34 through 37, and the processing unit 140 and the storage unit 150 attached to the second adaptor 510. FIG. 39 is an exploded perspective view of the second adaptor 510, the processing unit 140 and the storage unit 150 shown in FIG. 38.

The second adaptor 510 has, in the surface facing the support stand 110, a rectangular recess 511 in which a rectangular link 113 of the support stand 110 is to be engaged. As in the case of the second adaptor 410 of the display-and-processing component 400 shown in FIGS. 28 through 31 and in the case of the first adaptor 120 of the display component 200 shown in FIGS. 12 through 15, the second adaptor 510 is magnetically attracted to the support stand 110 when the link 113 of the support stand 110 is engaged in the recess 511. The recess 511 has an electric contact (not shown) and thus, it is possible to supply power from the support stand 110 to the second adaptor 510 by engaging the link 113 of the support stand 110 in the recess 511.

Formed on both flanks of the second adaptor 510 are vertically running two ridges 512: one (not shown) to be engaged in a channel 142 of the processing unit 140 and the other to be engaged in a channel 153 (see FIG. 33 for example) of the storage unit 150. These left and right ridges 512 are each provided with an electric contact (not shown). Therefore, when the ridges 512 are engaged in the channels 142 and 153 of the processing unit 140 and the storage unit 150, power supplied from the support stand 110 to the second adaptor 510 is further supplied to the processing unit 140 and the storage unit 150 through the electric contacts. The processing unit 140 and the storage unit 150 are magnetically attracted to the second adaptor 510 when the ridges 512 are engaged in the channels 142 and 153.

As shown in FIG. 35, the second adaptor 510 also has a ridge 514 that runs vertically on the surface facing the display panel 310. The ridge 514 is similar, in terms of shape and function, to the ridge 416 formed on the second adaptor 410 of the display-and-processing component 400 described with reference to FIGS. 28 through 33, and also to the ridge 121 formed on the first adaptor 120 of the display component 300 described with reference to FIGS. 24 through 27. The ridge 514 enables attachment of the display panel 310 to the second adaptor 510 and transfers power supplied from the support stand 110 to the display panel 310, by being engaged in a channel 312 (see FIG. 37) of the display panel 310. When the ridge 514 of the second adaptor 510 is engaged in the channel 312 of the display panel 310, the display panel 310 is magnetically attracted to the second adaptor 510 and also to the processing unit 140 and the storage unit 150 attached to the left and right flanks of the second adaptor 510.

As described above, although the size of the display panel 310 is large, the back face of the display panel 310 is supported in a wide area thereof. This is because the processing unit 140 and the storage unit 150 are fixed to the second adaptor 510, while spreading both sides of the second adaptor 510, thereby firmly securing the display panel 310.

Figure 40:
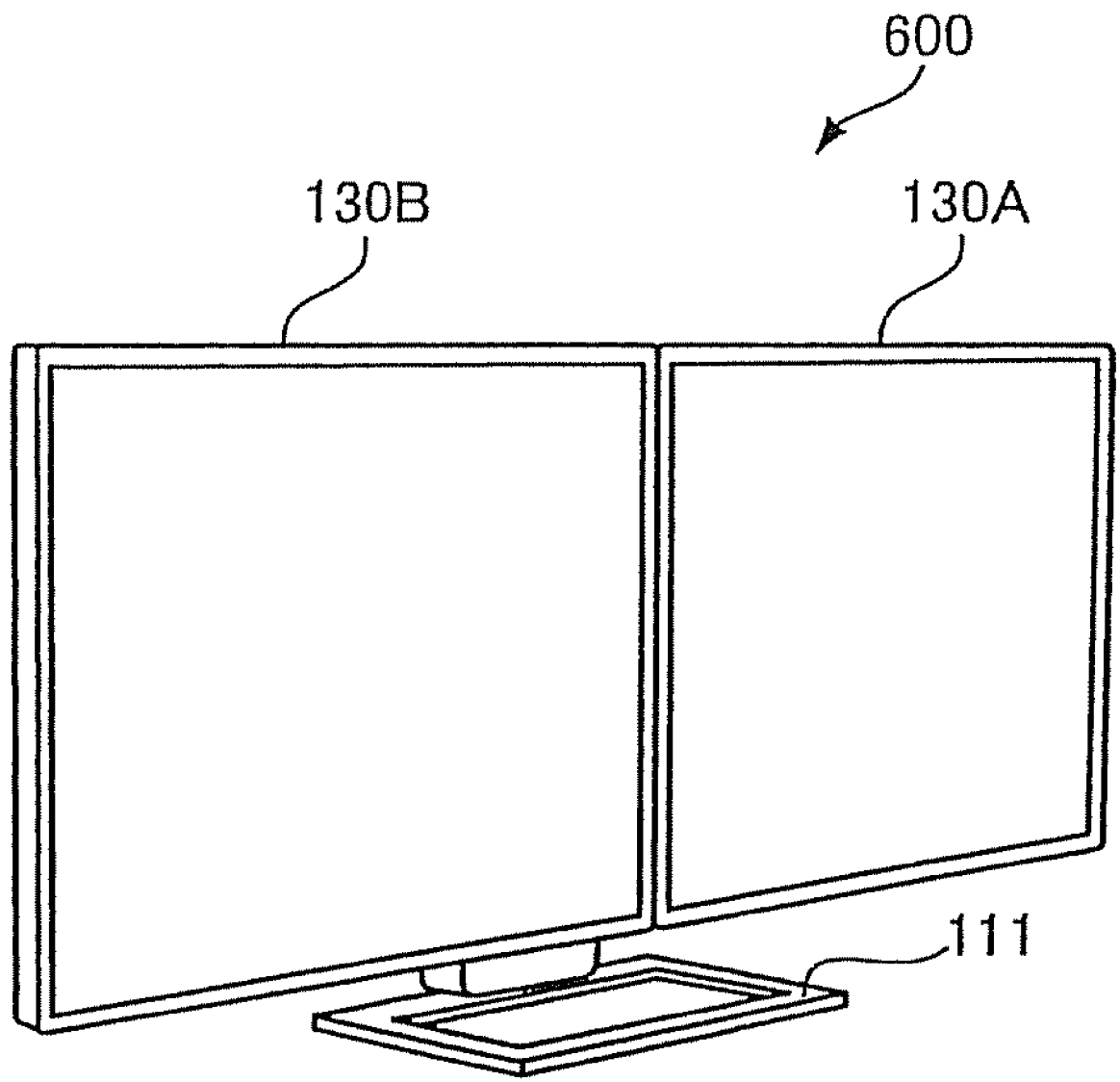
FIG. 40 is a perspective view of a third example of the display-and-processing component, as viewed from the front.
Figure 41:
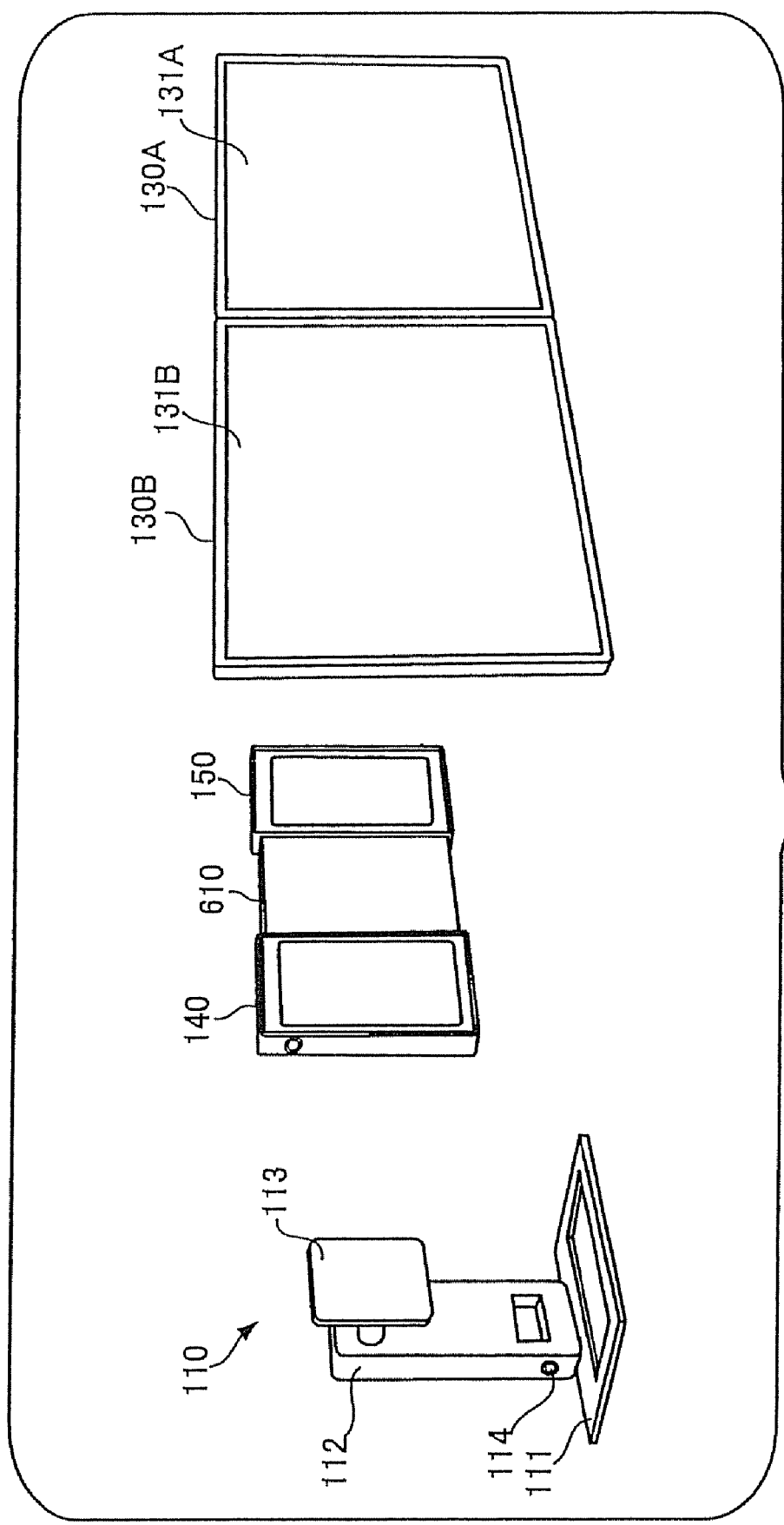
FIG. 41 is an exploded perspective view of the display-and-processing component shown in FIG. 40, as viewed from the front.
Figure 42:
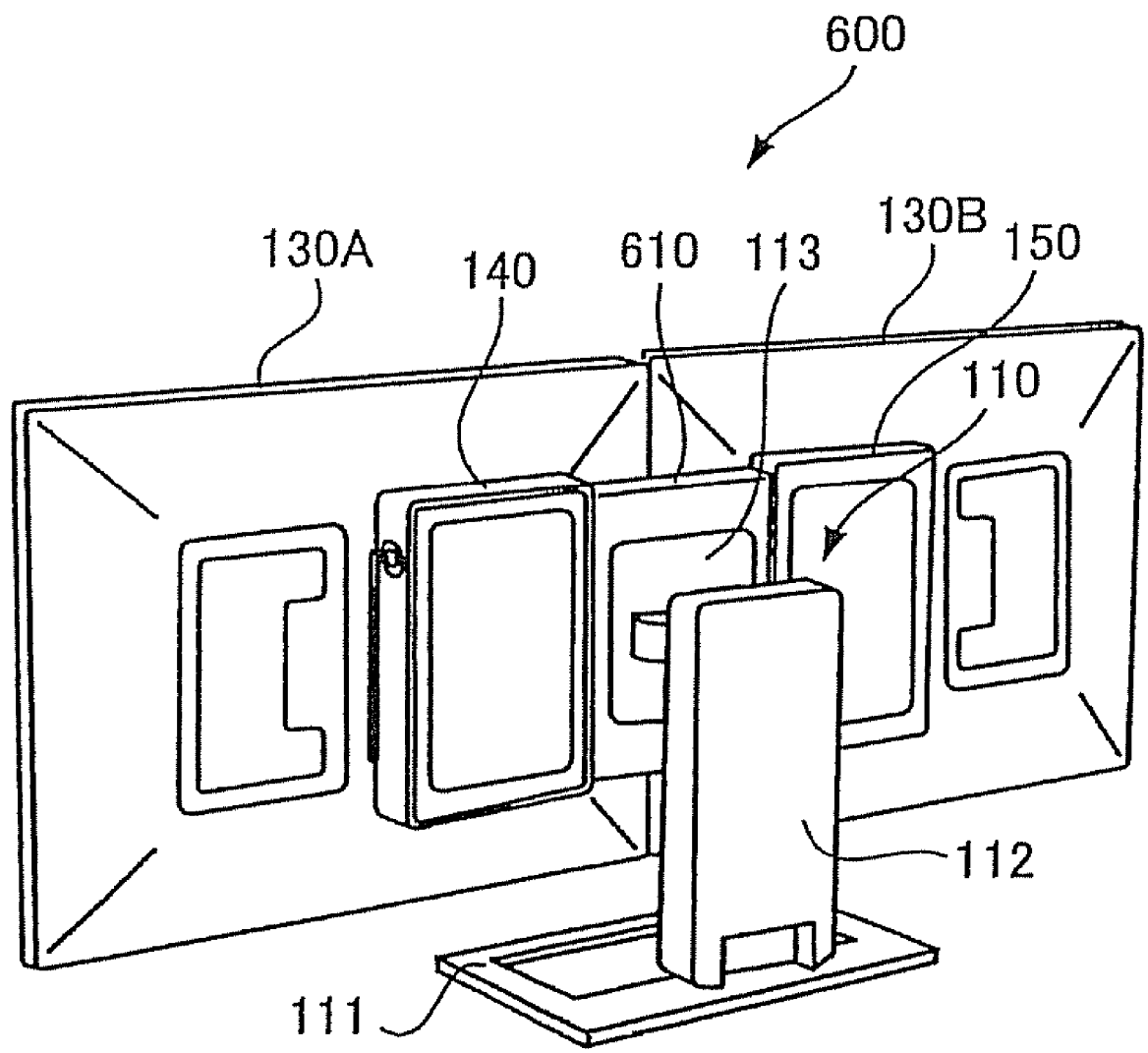
FIG. 42 is a perspective view of the display-and-processing component shown in FIG. 40, as viewed from the back.
Figure 43:
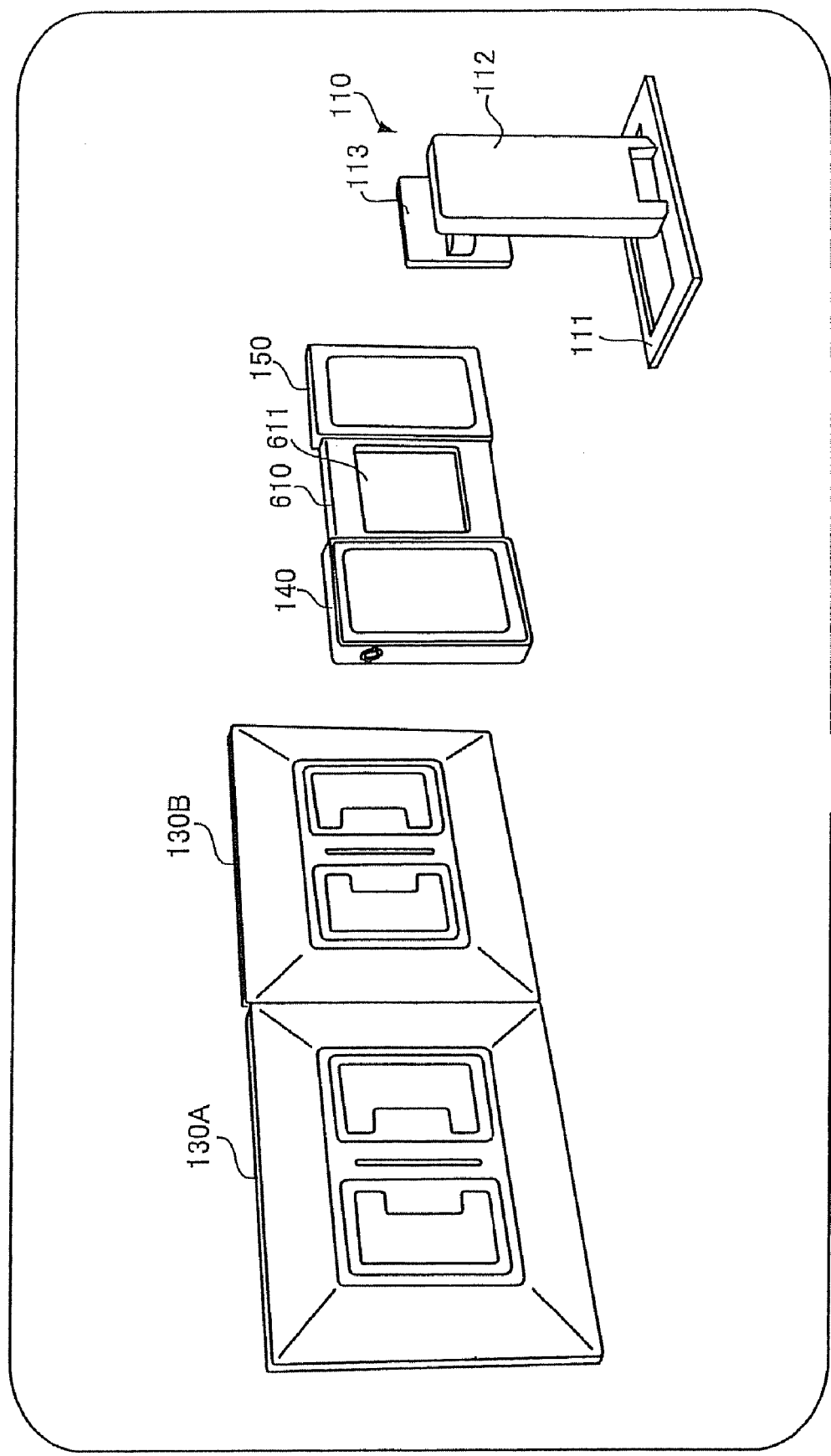
FIG. 43 is an exploded perspective view of the display-and-processing component shown in FIGS. 40 and 42, as viewed from the back.

FIG. 40 is a perspective view of a third example of the display-and-processing component as viewed from the front. FIG. 41 is an exploded perspective view of the display-and-processing component shown in FIG. 40, as viewed from the front. FIG. 42 is a perspective view of the display-and-processing component shown in FIG. 40, as viewed from the back. FIG. 43 is an exploded perspective view of the display-and-processing component shown in FIGS. 40 and 42, as viewed from the back.

The display-and-processing component shown in FIGS. 40 through 43 is a display-and-processing component 600 having a support stand 110, a second adapter 610, a processing unit 140, a storage unit 150 and two display panels 130A and 130B. Among them, the support stand 110 is similar to those of the display components and the display-and-processing components described so far, and the processing unit 140 and the storage unit 150 are also similar to those described so far. Also, the display panels 130A and 130B are similar to that of the display component 200 described with reference to FIGS. 12 through 15, and to that of the display-and-processing component 400 described with reference to FIGS. 28 through 33. The second adapter 610 of the display-and-processing component 600 shown in FIGS. 40 through 43 is similar to the second adapter 510 of the display-and-processing component 500 described with reference to FIGS. 34 through 39, except that while the second adapter 510 has the ridge 514 (see FIG. 35) on the surface facing the display panel 310, the second adapter 610 has no such a ridge. The second adapter 610 has ridges (not shown) similar to the ridges 512 formed on both flanks of the second adapter 510 employed in the display-and-processing component 500 described with reference to FIGS. 34 through 39, and also has a recess 611 similar to the recess 511 (see FIGS. 38 and 39) formed on the support-stand-facing surface of the second adapter 510.

The processing unit 140 and the storage unit 150 are magnetically attractable to the left and right flanks of the second adapter 610. The display panels 130A and 130B are supported by the support stand 110 when the panels 130A and 130B are magnetically attracted to the processing unit 140 and the storage unit 150, respectively.

In this configuration, the processing unit 140 and the storage unit 150 are supplied with power from the support stand 110 via the second adapter 610, but the display panels 130A and 130B are not supplied with power in this route passing the second adapter 610. For this reason, when the display-and-processing component 600 shown in FIGS. 40 through 43 is included in a range of selectable combinations, there is employed, for example, such a configuration that the display panels 130A and 130B are each provided with an AC adaptor connection terminal (not shown) for connecting an AC adaptor so that the display panels 130A and 130B can be directly supplied with AC power via the AC adaptor.

As described above, according to the embodiment, variable combinations and layouts are available and thus it is possible for each user to set up any desired easy-to-use system.

What is claimed is:

1. An information processing device comprising:
a support member having a base that lies flat and a pole that stands on the base;
a processing unit that performs data processing; and
a display section that displays an image, wherein
the support member is attachable to either a first adaptor that supports the display section when the first adaptor is attached to the support member or a second adaptor that supports the processing unit and the display section, such that the processing unit is hidden behind the display section, when the second adaptor is attached to the support member, and
the first and second adaptors are magnetically attractable to the support member.

2. The information processing device according to claim 1, wherein any of plural display sections of different sizes is selectable as the display section, and
the first adaptor is capable of supporting any of the plural display sections.

3. The information processing device according to claim 1, further comprising a storage unit that stores information,
wherein the processing unit and the storage unit, in the state of being supported by the second adaptor, support the display section, and
the second adaptor supports the display section via the processing unit and the storage unit by making the processing unit and the storage unit bear at least a part of the weight of the display section.

4. The information processing device according to claim 1, wherein the display section is magnetically attractable to the first adaptor.

5. The information processing device according to claim 3, wherein the processing unit and the storage unit are magnetically attractable to the second adaptor, and the display section is magnetically attractable to the processing unit and the storage unit.

6. The information processing device according to claim 1, further comprising a storage unit that stores information,
wherein when the second adaptor is attached to the support member, the second adaptor laterally supports the processing unit and the storage unit, and also supports a pair of the display sections laterally arranged, such that the processing unit and the storage unit are hidden behind the display sections.

7. The information processing device according to claim 6, wherein the processing unit and the storage unit, in the state of being supported by the second adaptor, support the respective display sections, and
the second adaptor supports the display sections via the processing unit and the storage unit, by making the processing unit bear at least a part of the weight of the display section supported by the processing unit while making the storage unit bear at least a part of the weight of the display section supported by the storage unit.

8. The information processing device according to claim 7, wherein the processing unit and the storage unit are magnetically attractable to the second adaptor, and the display sections are magnetically attractable to the processing unit and the storage unit, respectively.

9. A display device comprising:
a support member having a base that lies flat and a pole that stands on the base; and
an adaptor that supports any display section selected from plural display sections when the adaptor is attached to the support member, wherein
the adapter is either a first adaptor or a second adaptor,
the first adaptor supports a first display section selected from the plural display sections, when the first adaptor is attached to the support member,
the second adaptor supports a second display section selected from the plural display sections and different from the first display section, when the second adaptor in place of the first adaptor is attached to the support member, and the first and second adaptors are magnetically attractable to the support member.

10. The display device according to claim 9, further comprising a third adaptor as the adaptor, wherein the third adaptor is capable of supporting two or more first display sections selected from the plural display sections, when the third adaptor in place of the first and second adaptors is attached to the support member.

11. The display device according to claim 9, wherein the first and second display sections are of different sizes.

12. The display device according to claim 9, wherein the first and second display sections are magnetically attractable to the first and second adaptors, respectively.

* * * * *